(12) United States Patent
Kitazato et al.

(10) Patent No.: US 9,729,258 B2
(45) Date of Patent: Aug. 8, 2017

(54) TRANSMITTING DEVICE, TRANSMITTING METHOD, RECEIVING DEVICE, RECEIVING METHOD, PROGRAM, AND BROADCASTING SYSTEM

(75) Inventors: Naohisa Kitazato, Tokyo (JP); Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 803 days.

(21) Appl. No.: 13/422,203

(22) Filed: Mar. 16, 2012

(65) Prior Publication Data
US 2012/0253826 A1 Oct. 4, 2012

Related U.S. Application Data

(60) Provisional application No. 61/470,191, filed on Mar. 31, 2011.

(51) Int. Cl.
*H04H 60/13* (2008.01)
*H04H 60/73* (2008.01)
*H04N 21/236* (2011.01)
*H04N 21/2362* (2011.01)
*H04N 21/262* (2011.01)
(Continued)

(52) U.S. Cl.
CPC ............ *H04H 60/13* (2013.01); *H04H 60/73* (2013.01); *H04N 21/2362* (2013.01); *H04N 21/23614* (2013.01); *H04N 21/26275* (2013.01); *H04N 21/443* (2013.01); *H04N 21/4622* (2013.01); *H04N 21/6543* (2013.01); *H04N 21/8166* (2013.01); *H04N 21/4586* (2013.01); *H04N 21/4886* (2013.01)

(58) Field of Classification Search
CPC .. H04H 60/13; H04H 60/73; H04N 21/23614; H04N 21/2362; H04N 21/26275; H04N 21/443; H04N 21/4586; H04N 21/4622; H04N 21/4886; H04N 21/6543; H04N 21/8166
See application file for complete search history.

(56) References Cited

U.S. PATENT DOCUMENTS 5,438,423 A  8/1995 Lynch et al.
5,706,388 A  1/1998 Isaka
(Continued)

FOREIGN PATENT DOCUMENTS

CN  1674660  9/2005
EP  1 487 214 A1  12/2004
(Continued)

OTHER PUBLICATIONS

U.S. Appl. No. 13/107,604, filed May 13, 2011, Dewa.
(Continued)

*Primary Examiner* — Angela A Armstrong
(74) *Attorney, Agent, or Firm* — Oblon, McClelland, Maier & Neustadt, L.L.P.

(57) ABSTRACT

Disclosed herein is a transmitting device including an audio encoder and a transmitter. The audio encoder is configured to generate an encoded audio stream in which trigger information relating to control of an application program to be executed in conjunction with content in a receiving device is buried. The transmitter is configured to transmit the generated encoded audio stream to the receiving device.

17 Claims, 44 Drawing Sheets

(51) Int. Cl.
*H04N 21/443* (2011.01)
*H04N 21/462* (2011.01)
*H04N 21/6543* (2011.01)
*H04N 21/81* (2011.01)
*H04N 21/458* (2011.01)
*H04N 21/488* (2011.01)

(56) References Cited

U.S. PATENT DOCUMENTS

| | | | |
|---|---|---|---|
| 6,008,802 A | 12/1999 | Iki et al. | |
| 7,231,271 B2 * | 6/2007 | Gopalan | G10L 19/018 370/495 |
| 7,889,964 B1 | 2/2011 | Barton et al. | |
| 2001/0019657 A1 * | 9/2001 | McGrath | G11B 27/028 386/331 |
| 2005/0159831 A1 | 7/2005 | Gopalan et al. | |
| 2005/0262539 A1 * | 11/2005 | Barton et al. | 725/90 |
| 2005/0278747 A1 | 12/2005 | Barton et al. | |
| 2007/0127724 A1 * | 6/2007 | Kim | H04H 20/30 381/1 |
| 2009/0019500 A1 | 1/2009 | Tanaka et al. | |
| 2010/0080529 A1 | 4/2010 | Barton et al. | |
| 2011/0026526 A1 * | 2/2011 | Emura | H04N 21/242 370/392 |
| 2011/0075990 A1 | 3/2011 | Eyer | |
| 2011/0088075 A1 | 4/2011 | Eyer | |
| 2011/0126107 A1 | 5/2011 | Barton et al. | |
| 2011/0135276 A1 | 6/2011 | Barton et al. | |
| 2011/0200300 A1 | 8/2011 | Barton et al. | |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0027383 A1 | 2/2012 | Barton et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0051360 A1 | 3/2012 | Kitazato et al. | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0084802 A1 | 4/2012 | Kitazato | |
| 2012/0102519 A1 | 4/2012 | Kitazato | |
| 2012/0114301 A1 | 5/2012 | Barton et al. | |
| 2012/0162045 A1 | 6/2012 | Miyamatsu et al. | |
| 2012/0213494 A1 | 8/2012 | Barton et al. | |
| 2013/0243393 A1 | 9/2013 | Barton et al. | |

FOREIGN PATENT DOCUMENTS

| | | |
|---|---|---|
| EP | 1487214 | * 12/2004 |
| JP | 2005-176107 | 6/2005 |
| JP | 2006-050237 | 2/2006 |
| JP | 2008-536193 | 9/2008 |
| JP | 2010-166335 | 7/2010 |
| JP | 2011-61549 | 3/2011 |
| WO | 2006/080361 | 8/2006 |

OTHER PUBLICATIONS

U.S. Appl. No. 13/239,871, filed Sep. 22, 2011, Kitazato.
U.S. Appl. No. 13/238,277, filed Sep. 21, 2011, Kitazato.
U.S. Appl. No. 13/238,080, Sep. 21, 2011, Kitazato et al.
U.S. Appl. No. 13/238,138, filed Sep. 21, 2011, Kitazato.
U.S. Appl. No. 13/238,065, filed Sep. 21, 2011, Kitazato.
U.S. Appl. No. 13/238,264, filed Sep. 21, 2011, Kitazato.
The Extended European Search Report issued Aug. 14, 2014, in Application No. / Patent No. 12763323.8-1907 / 2693748.
International Search Report issued Apr. 24, 2012, in PCT/JP2012/057227 filed Mar. 21, 2012 ( with English-language translation).
U.S. Appl. No. 13/009,720, filed Jan. 19, 2011, Eyer, et al.
U.S. Appl. No. 13/304,126, filed Nov. 23, 2011, Eyer.
U.S. Appl. No. 13/452,376, filed Apr. 20, 2012, Kitahara, et al.
U.S. Appl. No. 13/490,216, filed Jun. 6, 2012, Eyer.
Office Action issued May 5, 2016 in Chinese Patent Application No. 201280014521.1 (with English translation).

* cited by examiner

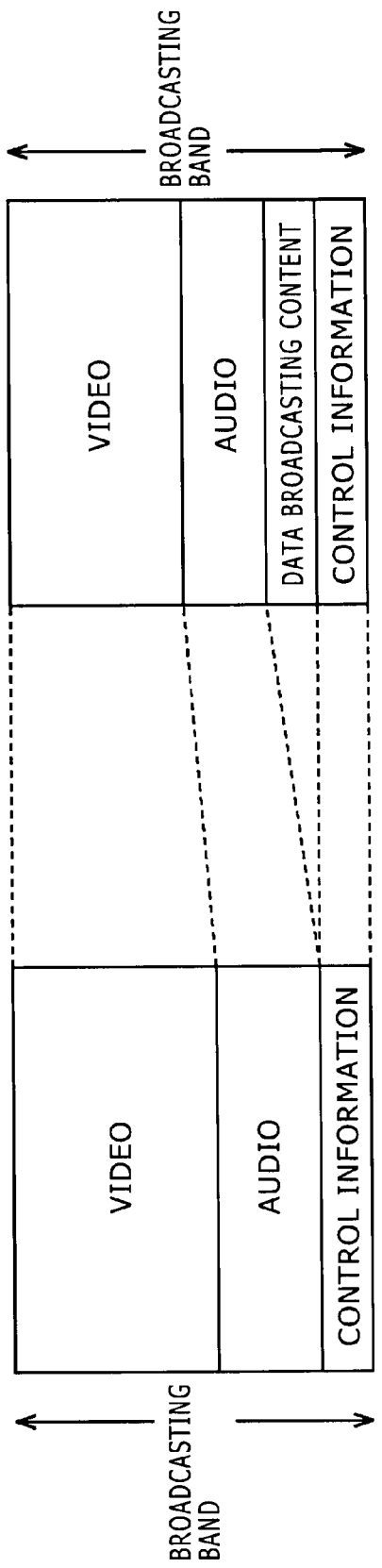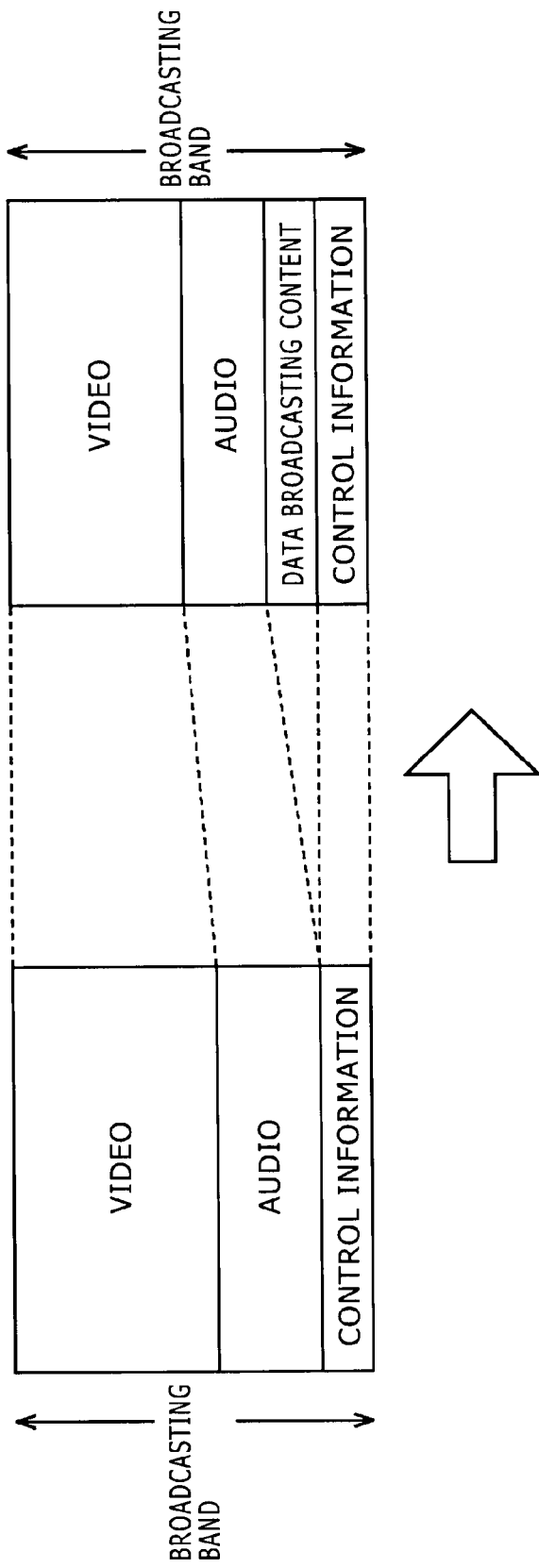

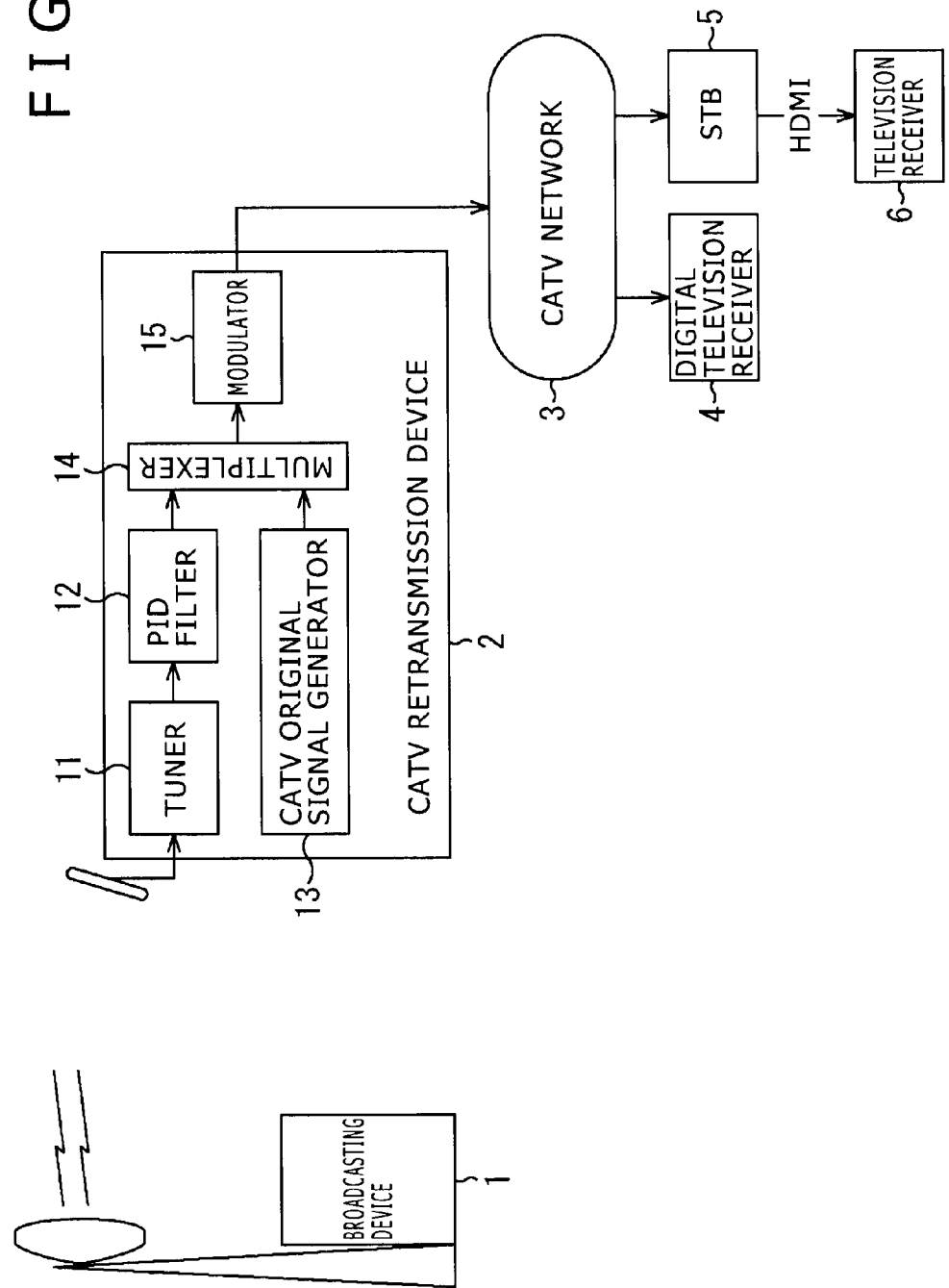

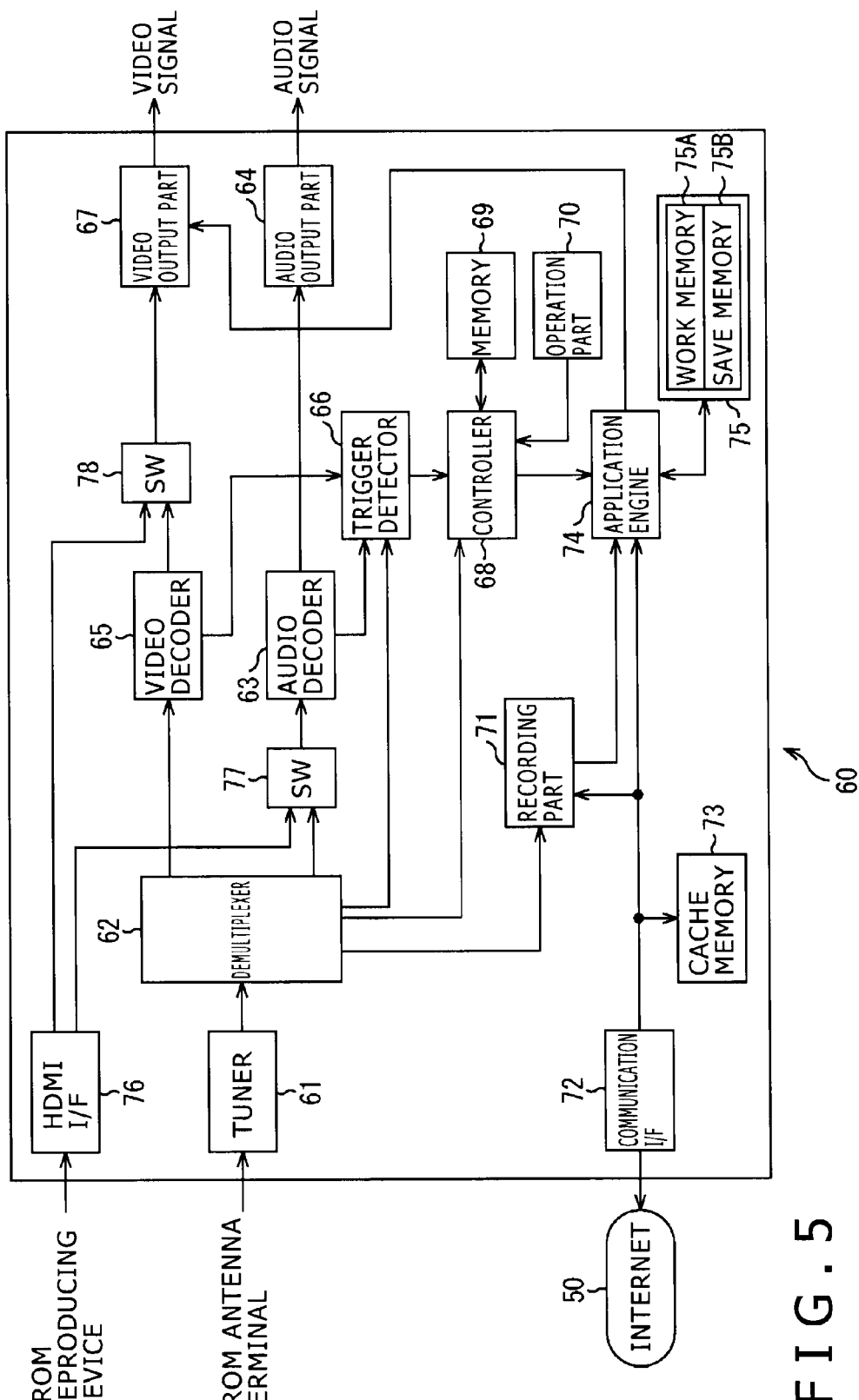
F I G . 5

FIG. 6

| Syntax | No. of Bits | Format |
|---|---|---|
| metadata() { | | |
|   sync_byte | 8 | bslbf |
|   metadata_type | 8 | bslbf |
|   reserved | 2 | '11' |
|   metadata_ID | 3 | bslbf |
|   metadata_length | 11 | uimsbf |
|   reserved | 3 | bslbf |
|   metadata_counter | 3 | bslbf |
|   metadata_start_flag | 1 | bslbf |
|   sync_control_flag | 1 | bslbf |
|   if(sync_control_flag) { | | |
|     metadata_length−=5 | | |
|     PTS_management() | | |
|   } | | |
|   for(I=0;I<metadata_length−1;i++) { | | |
|     data_byte | 8 | bslbf |
|   } | | |
| } | | |

FIG. 7

| Syntax | No. of Bits | Type |
|---|---|---|
| PTS_management ( ) { | | |
| reserved | 4 | 0xF |
| marker_bit | 1 | 1 |
| PTS[32..30] | 3 | uimsbf |
| marker_bit | 1 | 1 |
| PTS[29..15] | 15 | uimsbf |
| marker_bit | 1 | 1 |
| PTS[14..0] | 15 | uimsbf |
| } | | |

FIG. 8

| Syntax | No. of Bits | Format |
|---|---|---|
| metadata_packet() { | | |
|   packet_type | 8 | bslbf |
|   metadata_packet_length | 16 | uimsbf |
|   for (I=0;I<metadata_packet_length;i++) { | | |
|     data_byte | 8 | bslbf |
|   } | | |
| } | | |

FIG. 9

```
sync_byte(8bits)
 "00000001"    Specifies the unique word for metadata container
metadata_type(8bits)
 "00000011"    Trigger info data
 Other values  reserved
metadata_length(11bits)
               Specifies total byte count of metadata starting from
               the following field in the current audio frame.
metadata_ID(3bits)
               Specifies the identifier within the certain metadata type
metadata_counter(3bits)
               Specifies the incrementing at each audio frame in module 8
metadata_start_flag(1bit)
 "1"           Metadata_packet starts at the top of current metadata
               (FIXED TO 1 IN CASE OF Trigger infor data)
 "0"           The current metadata has the connected portion of
               metadata_packet from the previous metadata
sync_control_flag(1bit)
 "1"           Metadata is synchronized, and decoder shall refer to PTS
               in PTS_management()
 "0"           Metadata is not synchronized
packet_type(8bits) The content shall be identical to metadata_type in metadta()
 "00000011"    Trigger info data
metadata_packet_length(16bits)
               Specifies total byte count of metadata_packet()
```

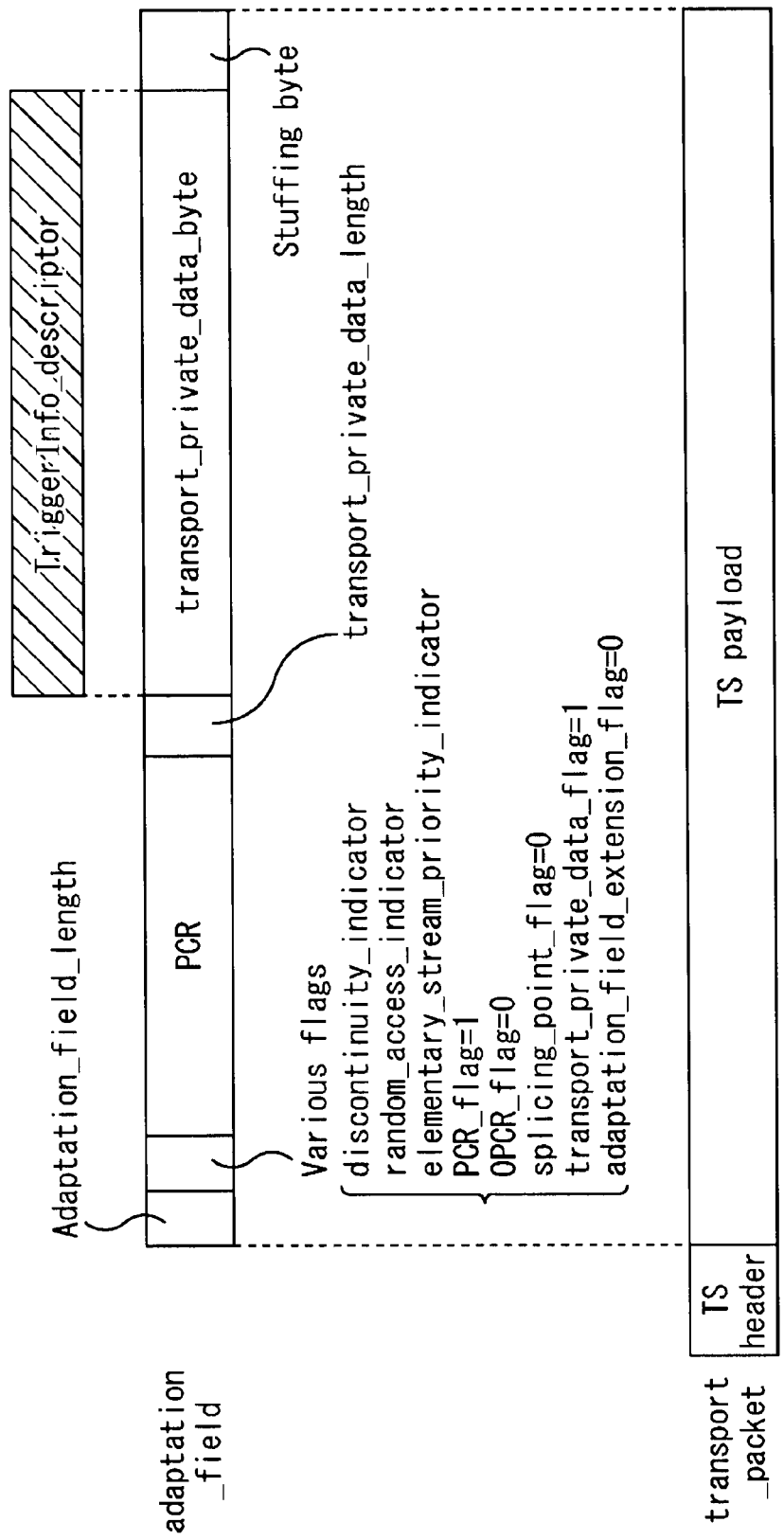

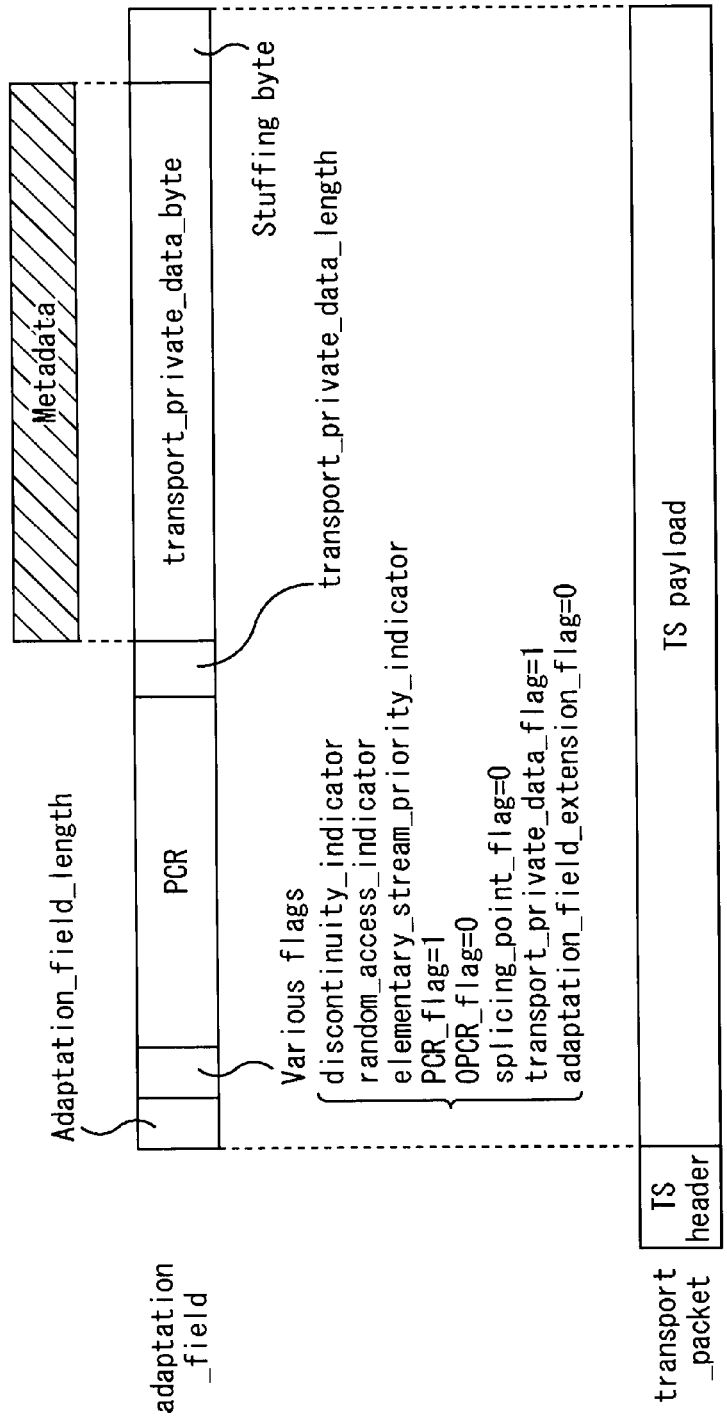

TWO-DIMENSIONAL BARCODE
→TRIGGER INFORMATION

FIG.14

```
video_sequence video_sequence() {
    next_start_code()
    sequence_header()
    if(nextbits()==extension_start_code) {
        sequence_extension()
        do {
            extension_and_user_data(0)
            do {
                if(nextbits()==group_start_code) {
                    group_of_pictures_header()
                    extension_and_user_data(1)
                }
                picture_header()
                picture_coding_extension()
                extensions_and_user_data(2)
                picture_data()
            }while((nextbits()==picture_start_code)||
                   (nextbits()==group_start_code))
            if(nextbits()!=sequence_end_code) {
                sequence_header()
                sequence_extension()
            }
        }while(nextbits()!=sequence_end_code)
    }else{
        /*ISO/IEC 11172-2*/
    }
    sequence_end_code
}
```

FIG.15 user_data

| DATA STRUCTURE | NO. OF BITS | BIT SEQUENCE REPRESENTATION |
|---|---|---|
| user_data() { | | |
|     user_data_start_code | 32 | uimsbf |
|     Trigger_Info_Data_identifier | 32 | uimsbf |
|     while(nextbits() != '0000 0000 0000 0000 0000 0000 0000 0001') { | | |
|         Trigger_info_data() | | |
|     } | | |
|     next_start_code() | | |
| } | | |

FIG. 17

Configuration of AUXILIARY DATA of AC3

| Syntax | Word Size |
|---|---|
| auxdata() | |
| { | |
|   auxbits | nauxbits |
|   if(auxdatae) | |
|   { | |
|     auxdatal | 14 |
|   } | |
|   auxdatae | 1 |
| } | |
| /* end of auxdata */ | |

FIG.19

| Syntax | No. of bits | Mnemonic |
|---|---|---|
| data_stream_element() | | |
| { | | |
|   element_instance_tag; | 4 | uimsbf |
|   data_byte_align_flag; | 1 | uimsbf |
|   cnt=count | 8 | uimsbf |
|   if(cnt==255) { | | |
|     Cnt+=esc_count; | 8 | uimsbf |
|   } | | |
|   if(data_byte_align_flg) { | | |
|     byte_alignment(); | | |
|   } | | |
|   for (i=0;i<cnt;i++) { | | |
|     data_stream_byte[element_instance_tag][i]; | 8 | uimsbf |
|   } | | |
| } | | |

FIG. 20

Trigger with "Pre-cache" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Pre-cache" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |

FIG. 21

Trigger with "Execute" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Execute" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |
| App_life_scope | 1 | 0: ES bound    1: service bound |
| App_expire_date | 32 | Passing over it, Application shall be terminated if Terminated Command is not issued. |

FIG. 22

Trigger with "Inject_event" command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Inject_event" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

FIG. 23

Trigger with "Suspend" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Suspend" command. |
| Trigger_validity | 8 | The reciprocal of this integer value shows probability this trigger shall be treated as valid. |
| App_id | 24 | Application identifier this command target |
| App_type | 4 | Application type (for example HTML5) |

FIG. 24

Trigger with "Terminate" Command

| Item | No. of Bits | explanation |
|---|---|---|
| Trigger_id | 8 | Identify Trigger with same function. |
| Protocol_version | 8 | Set to 0 currently |
| Command_code | 8 | In this case, it indicates "Terminate" command. |
| Trigger_validity | 8 | The reciprocal of this integer value shows probability this trigger shall be treated as valid. |
| App_id | 13 | Application identifier this command target |
| App_type | 4 | Application type (for example HTML5) |

FIG.25

| Syntax | No. of Bits | Format |
|---|---|---|
| Trigger_Info_data() { | | |
|     trigger_id | 8 | uimsbf |
|     protocol_version | 8 | uimsbf |
|     command_code | 8 | uimsbf |
|     trigger_validity | 8 | uimsbf |
|     App_id | 24 | uimsbf |
|     App_type | 4 | uimsbf |
|     App_url | 32 | |
|     if(command_code==1) { | | (pre-cache) |
|         broadcast_App_flag | 1 | uimsbf |
|         downloaded_App_flag | 1 | uimsbf |
|         internet_App_flag | 1 | uimsbf |
|         reserved | 1 | "1" |
|     } | | |
|     if(command_code==2) { | | (execute) |
|         broadcast_App_flag | 1 | uimsbf |
|         downloaded_App_flag | 1 | uimsbf |
|         internet_App_flag | 1 | uimsbf |
|         App_life_scope | 1 | uimsbf |
|         App_expire_date | 32 | bslbf |
|     } | | |
|     if(command_code==3) { | | (inject event) |
|         reserved | 4 | "1111" |
|         event_id | 16 | uimsbf |
|         event_embedded_data_length | 8 | uimsbf |
|         for(i=0;i<N;i++) { | | |
|             event_embedded_data_byte | 8×N | bslbsf |
|         } | | |
|     } | | |
|     if(command_code==4 \|\| command_code==5) { | | (suspend/ terminate) |
|         reserved | 4 | "1111" |
|     } | | |
| } | | |

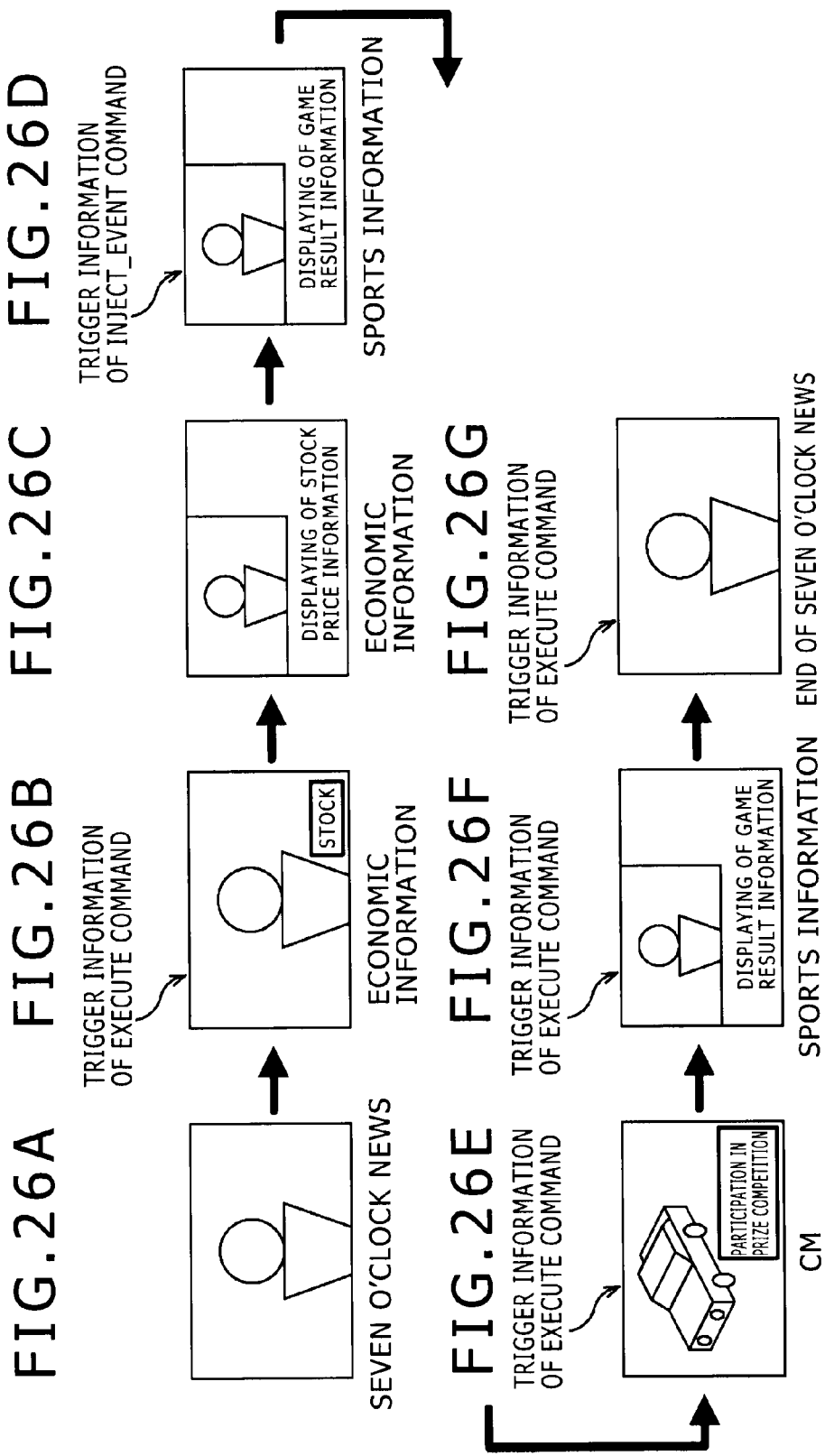

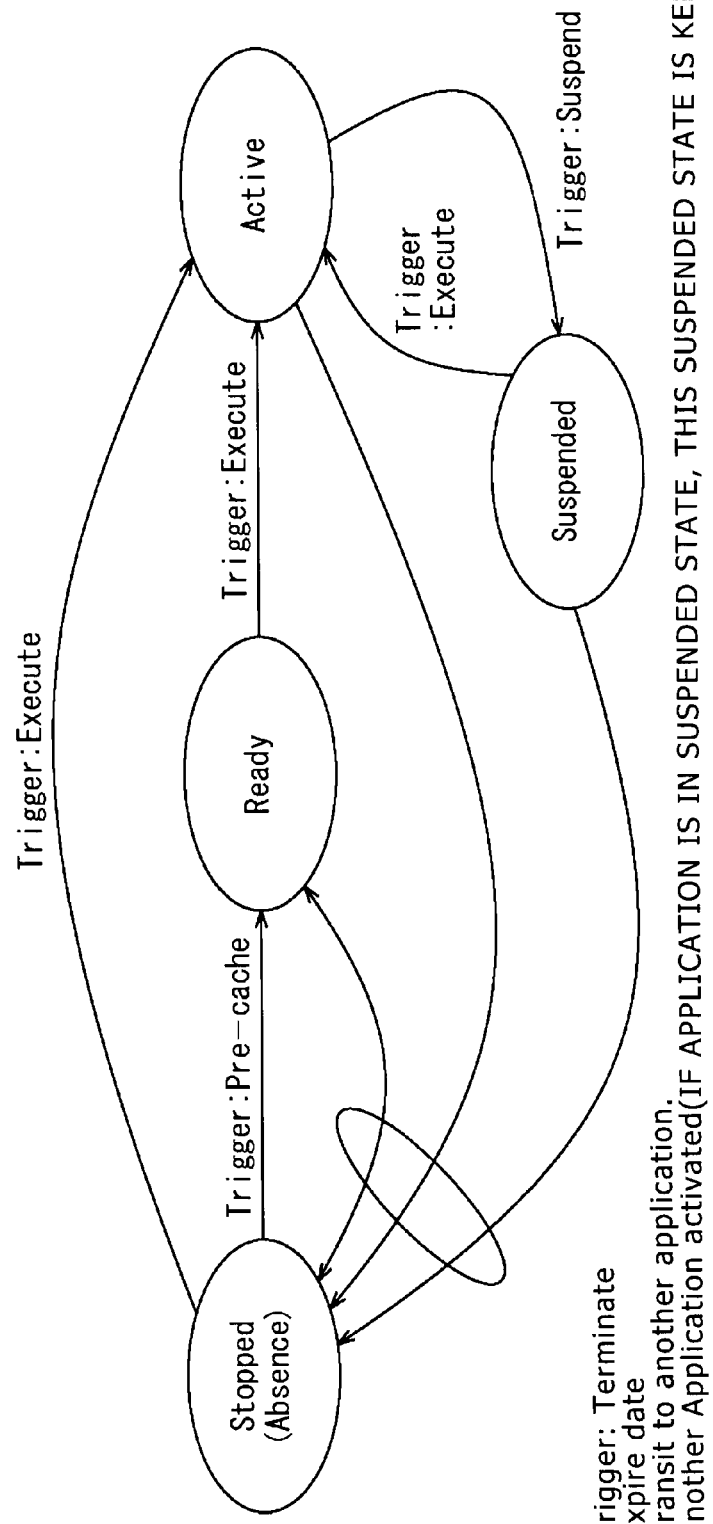

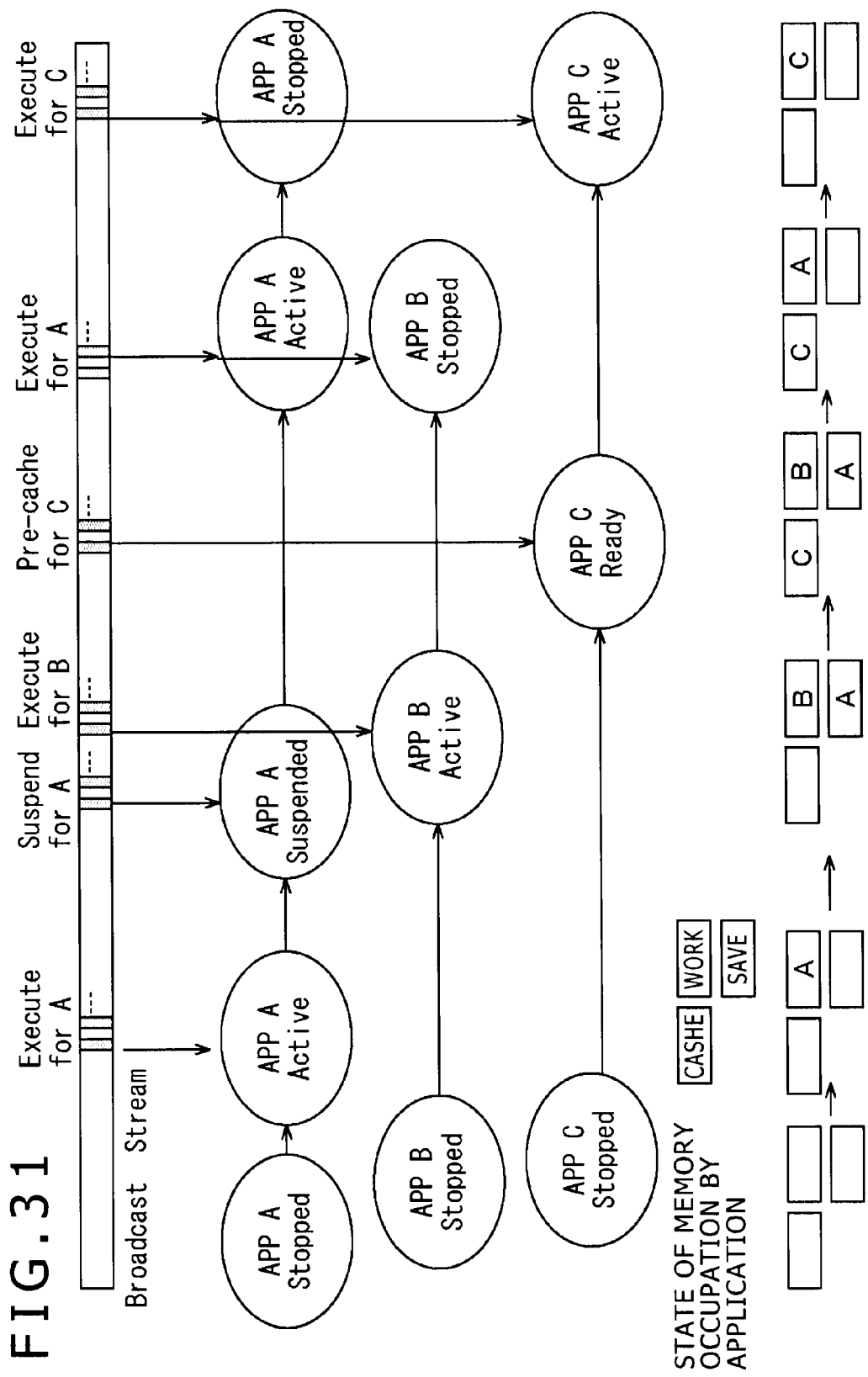

FIG.32

Trigger with "Register" Command

| Item | No. of Bits | explanation |
|---|---|---|
| Trigger_id | 8 | IDENTIFICATION OF TRIGGER INFORMATION WITH THE SAME CONTENTS |
| Protocol_version | 8 | FIXED TO 0 (VERSION NUMBER OF SYSTEM) |
| Command_code | 8 | VALUE INDICATING Register COMMAND |
| Trigger_validity | 8 | INFORMATION INDICATING PROBABILITY THAT TRIGGER INFORMATION IS VALID |
| App_id | N | APPLICATION ID (INDICATING ALSO URL OF ACQUISITION SOURCE OF APPLICATION) |
| App_type | 4 | SYSTEM TYPE OF APPLICATION |
| App_life_scope | 1 | OPERATION SCOPE OF APPLICATION |
| Persistent_priority | 2 | PRIORITY OF ACQUISITION AND RETENTION OF APPLICATION |
| Expire_date | 32 | RETENTION TIME LIMIT |

FIG.33

Trigger with "Execute" Command

| Item | No. of Bits | explanation |
|---|---|---|
| Trigger_id | 8 | IDENTIFICATION OF TRIGGER INFORMATION WITH THE SAME CONTENTS |
| Protocol_version | 8 | FIXED TO 0 (VERSION NUMBER OF SYSTEM) |
| Command_code | 8 | VALUE INDICATING Execute COMMAND |
| Trigger_validity | 8 | INFORMATION INDICATING PROBABILITY THAT TRIGGER INFORMATION IS VALID |
| App_id | N | APPLICATION ID (INDICATING ALSO URL OF ACQUISITION SOURCE OF APPLICATION) |
| App_type | 4 | SYSTEM TYPE OF APPLICATION |
| App_life_scope | 1 | OPERATION SCOPE OF APPLICATION |
| Persistent_priority | 2 | PRIORITY OF ACQUISITION AND RETENTION OF APPLICATION |
| Expire_date | 32 | RETENTION TIME LIMIT |

FIG.34

Trigger with "Inject_event" Command

| Item | No. of Bits | explanation |
|---|---|---|
| Trigger_id | 8 | IDENTIFICATION OF TRIGGER INFORMATION WITH THE SAME CONTENTS |
| Protocol_version | 8 | FIXED TO 0 (VERSION NUMBER OF SYSTEM) |
| Command_code | 8 | VALUE INDICATING Inject_event COMMAND |
| Trigger_validity | 8 | INFORMATION INDICATING PROBABILITY THAT TRIGGER INFORMATION IS VALID |
| App_id | N | APPLICATION ID (INDICATING ALSO URL OF ACQUISITION SOURCE OF APPLICATION) |
| Event_id | 8 | ID OF EVENT DESCRIBED IN SUBJECT APPLICATION |
| Event Embedded Data | M | DATA DELIVERED TO APPLICATION IN EVENT FIRING |

FIG.35

Trigger with "Suspend" Command

| Item | No. of Bits | explanation |
|---|---|---|
| Trigger_id | 8 | IDENTIFICATION OF TRIGGER INFROMATION WITH THE SAME CONTENTS |
| Protocol_version | 8 | FIXED TO 0 (VERSION NUMBER OF SYSTEM) |
| Command_code | 8 | VALUE INDICATING Suspend COMMAND |
| Trigger_validity | 8 | INFORMATION INDICATING PROBABILITY THAT TRIGGER INFORMATION IS VALID |
| App_id | N | APPLICATION ID (INDICATING ALSO URL OF ACQUISITION SOURCE OF APPLICATION) |

FIG. 36

Trigger with "Terminate" Command

| Item | No. of Bits | explanation |
|---|---|---|
| Trigger_id | 8 | IDENTIFICATION OF TRIGGER INFORMATION WITH THE SAME CONTENTS |
| Protocol_version | 8 | FIXED TO 0 (VERSION NUMBER OF SYSTEM) |
| Command_code | 8 | VALUE INDICATING Terminate COMMAND |
| Trigger_validity | 8 | INFORMATION INDICATING PROBABILITY THAT TRIGGER INFORMATION IS VALID |
| App_id | N | APPLICATION ID (INDICATING ALSO URL OF ACQUISITION SOURCE OF APPLICATION) |

FIG. 37

| Syntax | No. of Bits | Format |
|---|---|---|
| Trigger_Info_data() { | | |
|   trigger_id | 8 | uimsbf |
|   protocol_version | 8 | uimsbf |
|   command_code | 8 | uimsbf" |
|   trigger_validity | 8 | uimsbf |
|   app_id_length | 8 | uimsbf |
|   for(i=0;i<N;i++) { | | |
|     app_id_byte | 8 | bslbsf |
|   } | | |
|   if(command_code==1 \|\| command_code==2) { | | (register/execute) |
|     app_type | 4 | uimsbf |
|     app_life_scope | 1 | uimsbf |
|     persistent_priority | 2 | Uimsbf |
|     reserved | 1 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0;i<N;i++) { | | |
|       event_embedded_data_byte | 8×N | bslbf |
|     } | | |
|   } | | |
|   if(command_code==4 \|\| command_code==5) { | | (suspend/terminate) |
|     reserved | 4 | "1111" |
|   } | | |
| } | | |

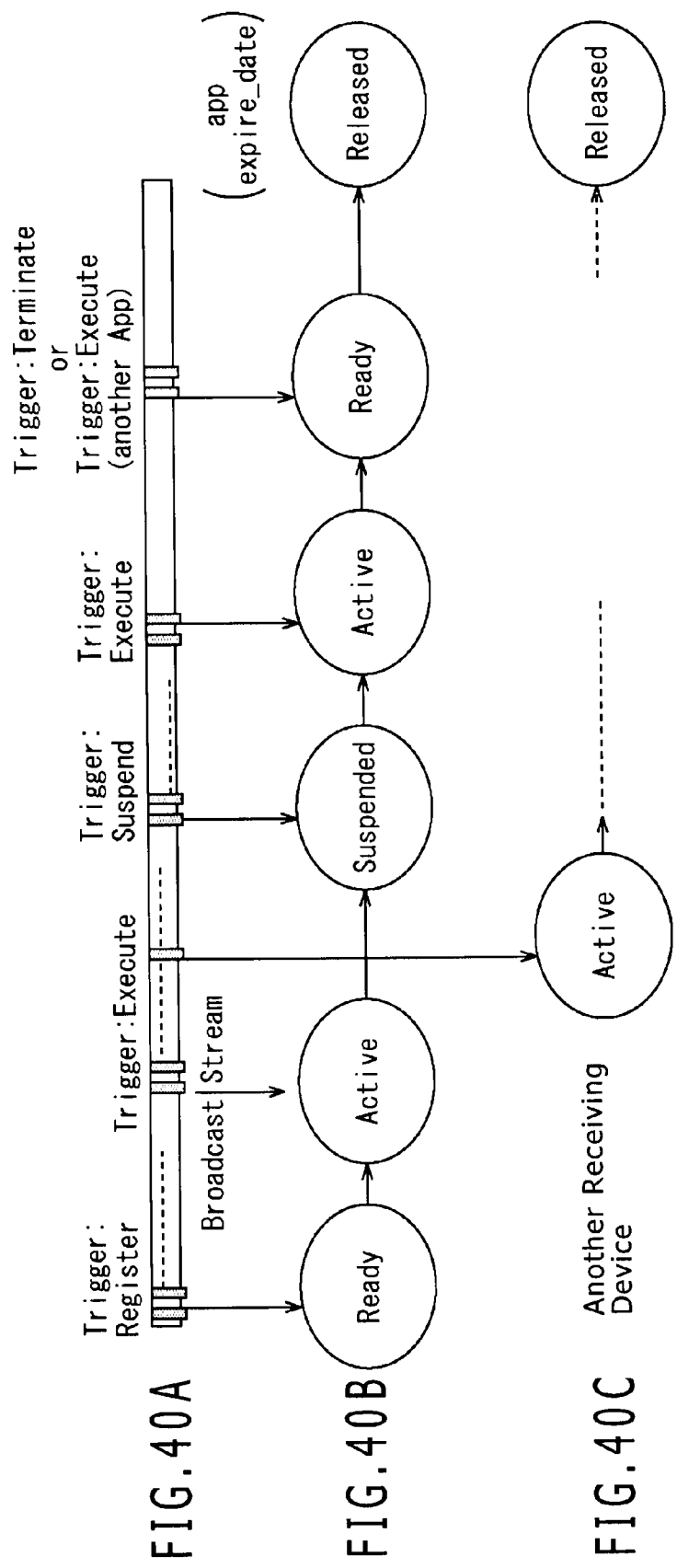

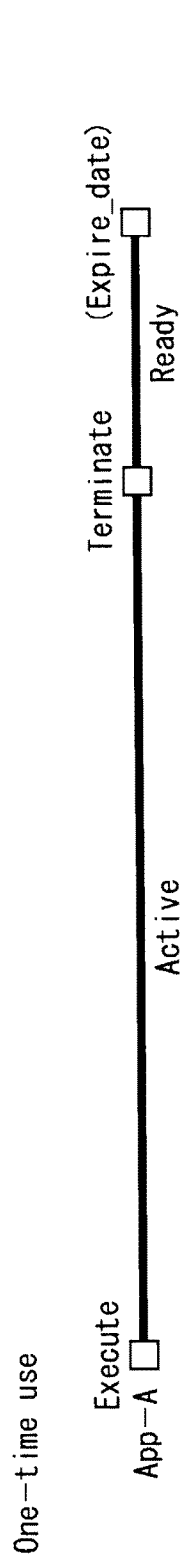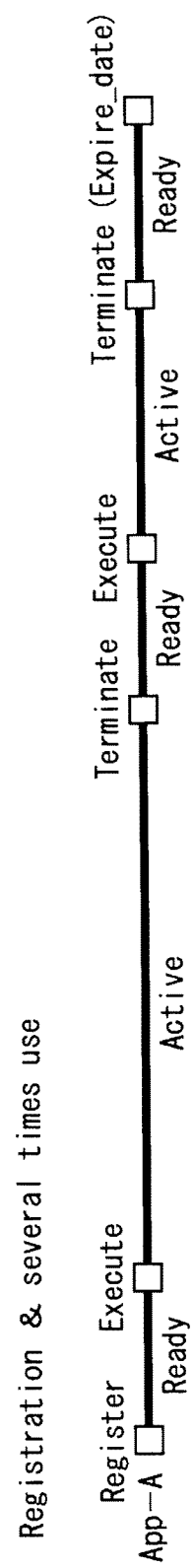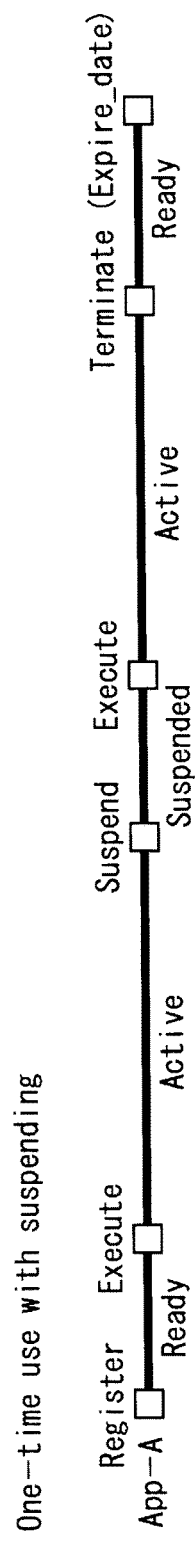
FIG.41A One-time use
FIG.41B Registration & several times use
FIG.41C One-time use with suspending

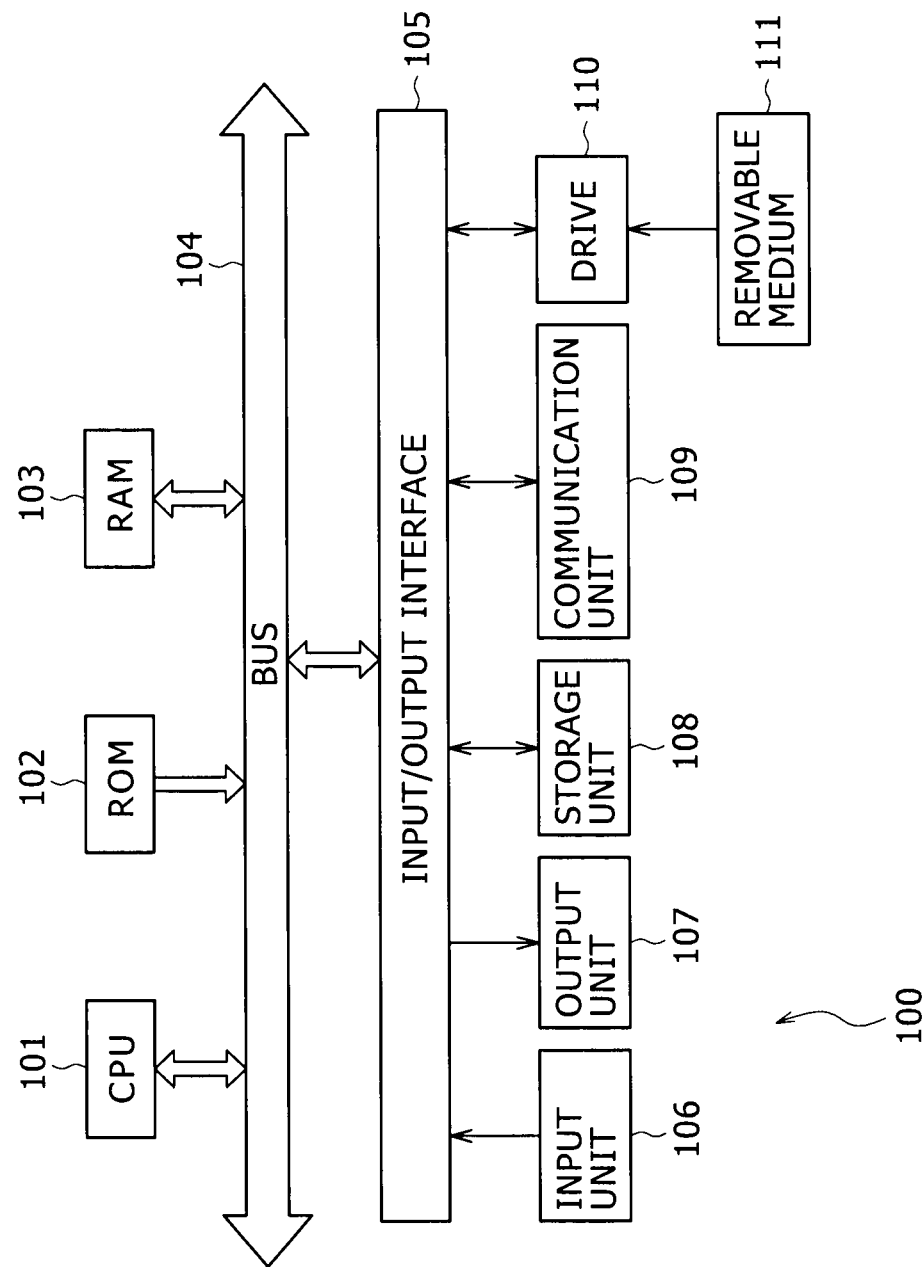

TRANSMITTING DEVICE, TRANSMITTING METHOD, RECEIVING DEVICE, RECEIVING METHOD, PROGRAM, AND BROADCASTING SYSTEM

CROSS-REFERENCE TO RELATED APPLICATION

This application claims the benefit of priority of Provisional Application Ser. No. 61/470,191, filed Mar. 31, 2011, the entire content of which is incorporated herein by reference.

BACKGROUND

The present disclosure relates to a transmitting device, a transmitting method, a receiving device, a receiving method, a program, and a broadcasting system, and particularly to a transmitting device, a transmitting method, a receiving device, a receiving method, a program, and a broadcasting system that are suitable to be used in the case of executing content of data broadcasting in conjunction with the progression of show and commercial message (CM) in e.g. digital television broadcasting.

In Japan, digitalization of television broadcasting is being promoted and terrestrial digital broadcasting, BS digital broadcasting, etc. are prevalent. In the digital television broadcasting such as the terrestrial digital broadcasting, not only broadcasting of shows of news, drama, movie, etc. but also so-called data broadcasting is also realized. According to content in this data broadcasting, for example information relating to the on-air show (performer, story, etc.) can be displayed and information having no relation to the on-air show (announcement of another show, news, weather forecast, traffic information, etc.) can be displayed (refer to e.g. Japanese Patent Laid-open No. 2006-50237).

For the data broadcasting in Japan, in the digitalization of the television broadcasting, the band dedicated to the data broadcasting is ensured in advance in the broadcasting band of the digital television broadcasting. The data broadcasting in Japan is realized by broadcasting data broadcasting content by use of this dedicated band.

In contrast, in the digital television broadcasting in the United States, the band dedicated to the data broadcasting like that in the digital television broadcasting in Japan is not ensured.

Specifically, as shown in FIG. 1A, the broadcasting band of the present digital television broadcasting in the United States is occupied by the band for video of the show, the band for audio, and the band for control information, and the band for broadcasting data broadcasting content is not set. Therefore, to ensure the band for broadcasting data broadcasting content in the limited broadcasting band of the digital television broadcasting, for example the band for video and the band for audio need to be narrowed as shown in FIG. 1B.

SUMMARY

However, ensuring the band for broadcasting data broadcasting content by narrowing the band for video and the band for audio leads to the deterioration of image quality and sound quality of shows and therefore is far from practical countermeasures.

Furthermore, even if the band for data broadcasting content is ensured by narrowing the band for video and the band for audio, the amount of data that can be transmitted is limited. Therefore, the amount of information of the data broadcasting content will be poor. If increasing the amount of information is attempted, it will take a long time for the receiving side to receive the necessary data.

In addition, in the United States, a retransmission system for digital television shows by use of a cable TV (CATV) network is prevalent, and therefore possibly the following problem also occurs.

FIG. 2 shows one example of the configuration of the retransmission system for digital television shows by use of a CATV network.

This retransmission system is composed mainly of a broadcasting device 1, a CATV retransmission device 2, a CATV network 3, a digital television receiver 4, a set-top box (STB) 5, and a television receiver 6.

The broadcasting device 1 set in e.g. a broadcasting station broadcasts a digital television broadcast signal by using a terrestrial wave or a satellite wave. The CATV retransmission device 2 set in e.g. a cable TV station receives the digital television broadcasting to remove unnecessary information and add original information of the CATV to the received broadcasting. Subsequently, the CATV retransmission device 2 retransmits the broadcasting to the digital television receiver 4, the set-top box 5, and so forth via the CATV network 3.

The CATV retransmission device 2 includes a tuner 11, a PID filter 12 for filtering of a packet of a predetermined packet ID, a CATV original signal generator 13, a multiplexer 14, and a modulator 15.

The tuner 11 receives and demodulates digital television broadcast signals of the respective channels, and outputs the resulting transport stream (TS) to the PID filter 12. The PID filter 12 removes a packet corresponding to a predetermined packet ID (packet having no relation to AV content as the show) from the TS and outputs the resulting TS to the multiplexer 14. The CATV original signal generator 13 generates a packet in which original information of the CATV station is stored and outputs it to the multiplexer 14. The multiplexer 14 multiplexes the output of the PID filter 12 and the output of the CATV original signal generator 13 and outputs the resulting TS to the modulator 15. The modulator 15 modulates the output of the multiplexer 14 by a modulation system suitable for the CATV network 3 and retransmits the modulated TS to the digital television receiver 4, the set-top box 5, and so forth via the CATV network 3.

The digital television receiver 4 compliant with the CATV receives the TS of the retransmitted digital television broadcasting via the CATV network 3 and decodes the TS, to display the resulting video and output audio.

The set-top box 5 compliant with the CATV receives the TS of the retransmitted digital television broadcasting via the CATV network 3 and decodes the TS, to output the resulting video signal and audio signal to the television receiver 6 via e.g. an HDMI cable. Based on the video signal and the audio signal input from the set-top box 5 via e.g. the HDMI cable, the television receiver 6 displays video and outputs audio.

As described above, in the CATV retransmission device 2, the packet corresponding to the predetermined packet ID (packet having no relation to AV content as the show) is removed from the TS of the digital broadcast signal by the PID filter 12. Therefore, even if the band for broadcasting data broadcasting content is ensured in the broadcasting band as shown in FIG. 1B, possibly the packet in which the data broadcasting content is stored is excluded by this PID filter 12.

There is a need for a technique to allow realization of data broadcasting content that can be in conjunction with the progression of show and CM of television broadcasting without setting the band for data broadcasting in the broadcasting band of digital television broadcasting.

According to a first embodiment of the present disclosure, there is provided a transmitting device including an audio encoder configured to generate an encoded audio stream in which trigger information relating to control of an application program to be executed in conjunction with content in a receiving device is buried, and a transmitter configured to transmit the generated encoded audio stream to the receiving device.

The transmitting device further includes a controller configured to supply metadata in which the trigger information is stored and size information for burying the metadata in a user data area of the encoded audio stream, and carry out control so that the metadata may be buried in the user data area.

The audio encoder encodes an audio stream by an AC3 (Audio Code number 3) system to generate the encoded audio stream, and the metadata is inserted in an area of AUX (AUXILIARY DATA) in the frame structure of the AC3 system.

The audio encoder encodes an audio stream by an AAC (Advanced Audio Coding) system to generate the encoded audio stream, and the metadata is inserted in an area of DSE (Data Stream Element) in the frame structure of the AAC system.

The transmitting device further includes a video encoder configured to encode a video stream to generate an encoded video stream, and a multiplexer configured to multiplex the encoded audio stream and the encoded video stream to generate a multiplexed stream. The transmitter transmits the generated multiplexed stream.

Type information indicating the type of information is added to the metadata.

A plurality of kinds of information distinguished by an information identifier are included in the metadata.

A transmitting method or a program according to the first embodiment of the present disclosure is a transmitting method or a program corresponding to the above-described transmitting device according to the first embodiment of the present disclosure.

In the first embodiment of the present disclosure, the encoded audio stream in which the trigger information relating to control of the application program to be executed in conjunction with content in the receiving device is buried is generated, and the generated encoded audio stream is transmitted to the receiving device.

According to a second embodiment of the present disclosure, there is provided a receiving device including a receiver configured to receive an encoded audio stream in which trigger information relating to control of an application program to be executed in conjunction with content is buried. The encoded audio stream is transmitted from a transmitting device. The receiving device further includes an audio decoder configured to decode the received encoded audio stream, and a controller configured to control processing relating to the application program executed in conjunction with the content in response to the trigger information obtained by decoding the encoded audio stream.

The audio decoder acquires the trigger information stored in metadata from an area of AUX in the frame structure of the encoded audio stream encoded by an AC3 system.

The audio decoder acquires the trigger information stored in metadata from an area of DSE in the frame structure of the encoded audio stream encoded by an AAC system.

The receiving device further includes a demultiplexer configured to demultiplex a received multiplexed stream, and a video decoder configured to decode an encoded video stream demultiplexed from the multiplexed stream. The audio decoder decodes the encoded audio stream demultiplexed from the multiplexed stream.

A receiving method or a program according to the second embodiment of the present disclosure is a receiving method or a program corresponding to the above-described receiving device according to the second embodiment of the present disclosure.

In the second embodiment of the present disclosure, the encoded audio stream in which the trigger information relating to control of the application program to be executed in conjunction with the content is buried, transmitted from the transmitting device, is received, and the received encoded audio stream is decoded. Furthermore, processing relating to the application program executed in conjunction with the content is controlled in response to the trigger information obtained by decoding the encoded audio stream.

According to a third embodiment of the present disclosure, there is provided a broadcasting system including a transmitting device configured to transmit content, and a receiving device configured to receive transmitted content. The transmitting device includes an audio encoder that generates an encoded audio stream in which trigger information relating to control of an application program to be executed in conjunction with content in the receiving device is buried, and a transmitter that transmits the generated encoded audio stream to the receiving device. The receiving device includes a receiver that receives the encoded audio stream transmitted from the transmitting device, an audio decoder that decodes the received encoded audio stream, and a controller that controls processing relating to the application program executed in conjunction with the content in response to the trigger information obtained by decoding the encoded audio stream.

In the third embodiment of the present disclosure, by the transmitting device, the encoded audio stream in which the trigger information relating to control of the application program to be executed in conjunction with content in the receiving device is buried is generated, and the generated encoded audio stream is transmitted to the receiving device. By the receiving device, the encoded audio stream transmitted from the transmitting device is received, and the received encoded audio stream is decoded. Furthermore, processing relating to the application program executed in conjunction with the content is controlled in response to the trigger information obtained by decoding the encoded audio stream.

According to the first embodiment of the present disclosure, data broadcasting content can be controlled in conjunction with the progression of show, CM, etc. of television broadcasting without setting the band for data broadcasting in the broadcasting band of digital television broadcasting.

According to the second embodiment of the present disclosure, data broadcasting content can be controlled in conjunction with the progression of show, CM, etc. of television broadcasting without setting the band for data broadcasting in the broadcasting band of digital television broadcasting.

According to the third embodiment of the present disclosure, data broadcasting content can be controlled in conjunction with the progression of show, CM, etc. of television broadcasting without setting the band for data broadcasting in the broadcasting band of digital television broadcasting.

BRIEF DESCRIPTION OF THE DRAWINGS

FIGS. 1A and 1B are diagrams showing the broadcasting band of digital television broadcasting;

FIG. 2 is a diagram showing one example of the configuration of an existing CATV retransmission system;

FIG. 5 is a block diagram showing a configuration example of a receiving device according to the embodiment;

FIG. 6 is a diagram showing metadata generic syntax;

FIG. 7 is a diagram showing the metadata generic syntax;

FIG. 8 is a diagram showing the metadata generic syntax;

FIG. 9 is a diagram showing the metadata generic syntax;

FIG. 11 is a diagram showing the specific location of the trigger information in the PCR packet;

FIG. 12 is a diagram showing the specific location of metadata in the PCR packet;

FIG. 14 is a diagram showing the specific location of trigger information inserted in an encoded video stream;

FIG. 15 is a diagram showing the specific location of the trigger information inserted in the encoded video stream;

FIG. 17 is a diagram showing the specific location of metadata inserted in an encoded audio stream (AC3);

FIG. 19 is a diagram showing the specific location of metadata inserted in an encoded audio stream (AAC);

FIG. 20 is a diagram showing items included in trigger information with a Pre_cache command in a first embodiment of the present disclosure;

FIG. 21 is a diagram showing items included in trigger information with an Execute command in the first embodiment;

FIG. 22 is a diagram showing items included in trigger information with an Inject_event command in the first embodiment;

FIG. 23 is a diagram showing items included in trigger information with a Suspend command in the first embodiment;

FIG. 24 is a diagram showing items included in trigger information with a Terminate command in the first embodiment;

FIG. 25 is a diagram showing one example of the syntax of trigger information compatible with the first embodiment;

FIGS. 26A to 26G are diagrams showing a display example when an application program is executed in conjunction with the progression of show and CM;

FIG. 30 is a diagram of a first state transition of an application program in the receiving device;

FIG. 31 is a diagram showing one example of the scenario when plural application programs are simultaneously controlled;

FIG. 32 is a diagram showing items included in trigger information with a Register command in a second embodiment of the present disclosure;

FIG. 33 is a diagram showing items included in trigger information with the Execute command in the second embodiment;

FIG. 34 is a diagram showing items included in trigger information with the Inject_event command in the second embodiment;

FIG. 35 is a diagram showing items included in trigger information with the Suspend command in the second embodiment;

FIG. 36 is a diagram showing items included in trigger information with the Terminate command in the second embodiment;

FIG. 37 is a diagram showing one example of the syntax of trigger information compatible with the second embodiment;

FIGS. 40A to 40C are diagrams showing the relationship between commands and state transition;

FIGS. 41A to 41C show the life cycles of an application program in the second embodiment;

FIG. 44 is a block diagram showing a configuration example of a computer.

DETAILED DESCRIPTION OF THE PREFERRED EMBODIMENTS

Best modes for carrying out the invention (hereinafter, referred to as embodiments) will be described in detail below with reference to the drawings.

1. First Embodiment

Configuration Example of Broadcasting System

Figure 3:
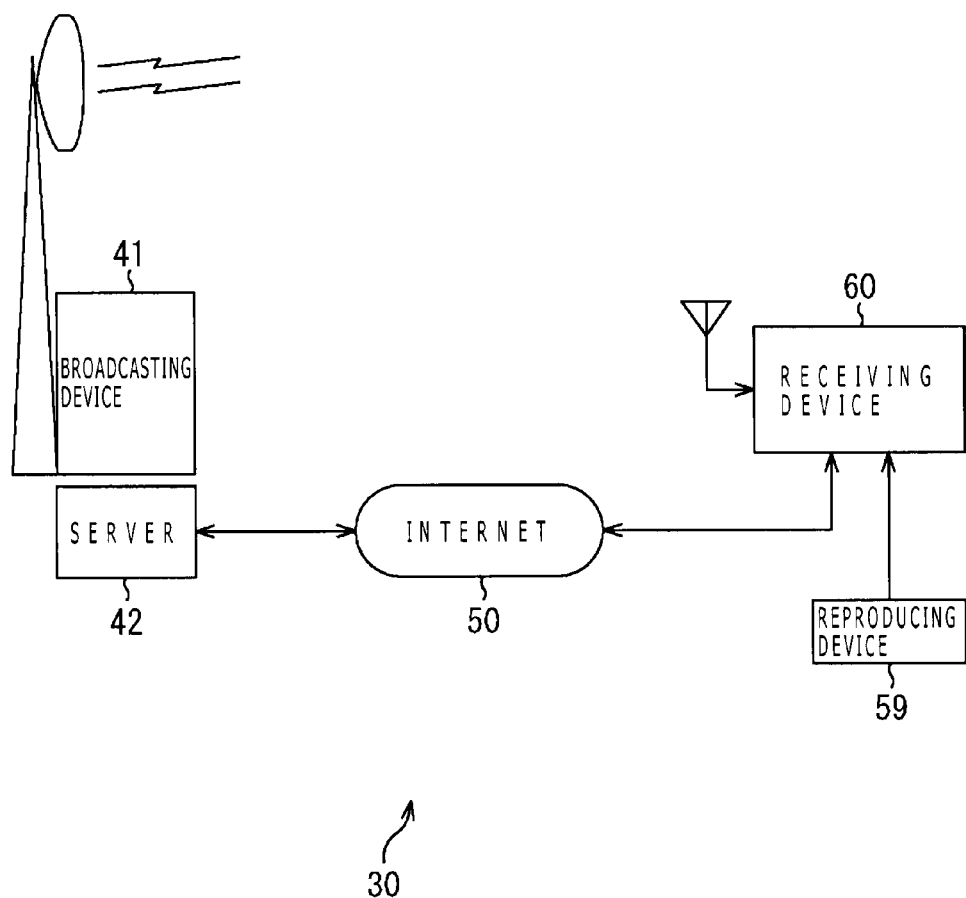
FIG. 3 is a diagram showing a configuration example of a broadcasting system according to an embodiment of the present disclosure.

FIG. 3 shows a broadcasting system of an embodiment. This broadcasting system 30 realizes data broadcasting content that can be in conjunction with AV content of show, CM, etc. in the state in which the band for broadcasting the data broadcasting content is not set in the broadcasting band of digital television broadcasting like in e.g. the present United States.

The data broadcasting content is realized by activation of an application program supplied to a receiving device by the receiving device. Therefore, hereinafter, the data broadcasting content will be referred to also as data broadcasting application program or data broadcasting application. The data broadcasting application may be configured from one program data or may be a program data group composed of plural program data.

This broadcasting system 30 is composed of a broadcasting device 41 and a server 42 that are provided on the broadcasting station side, and a reproducing device 59 and a receiving device 60 that are provided on the receiver side.

The broadcasting device 41 transmits a digital television broadcast signal. Furthermore, the broadcasting device 41 transmits trigger information as a command relating to the operation of data broadcasting content linked to AV content in such a manner that the trigger information is included in the digital television broadcast signal. Specifically, the trigger information is so transmitted as to be disposed in the transport stream (TS) of the digital television broadcast signal or buried in a video signal.

The trigger information includes information indicating the kind of command, information indicating the acquisition source of a data broadcasting application, and so forth. Details of the trigger information will be described later.

The server 42 supplies a data broadcasting application in response to a request from the receiving device 60 that accesses the server 42 via the Internet 50.

The receiving device 60 receives a digital broadcast signal broadcast from the broadcasting device 41 and outputs video and audio of AV content to a monitor (not shown). Furthermore, the receiving device 60 accesses the server 42 via the Internet 50 and acquires data broadcasting content. It is to be noted that, this receiving device 60 may exist as a single device or may be included in e.g. a television receiver or a video recorder.

The reproducing device 59 reproduces video and audio of AV content recorded in e.g. a predetermined recording medium and outputs them to the receiving device 60.

[Configuration Example of Broadcasting Device]

Figure 4:
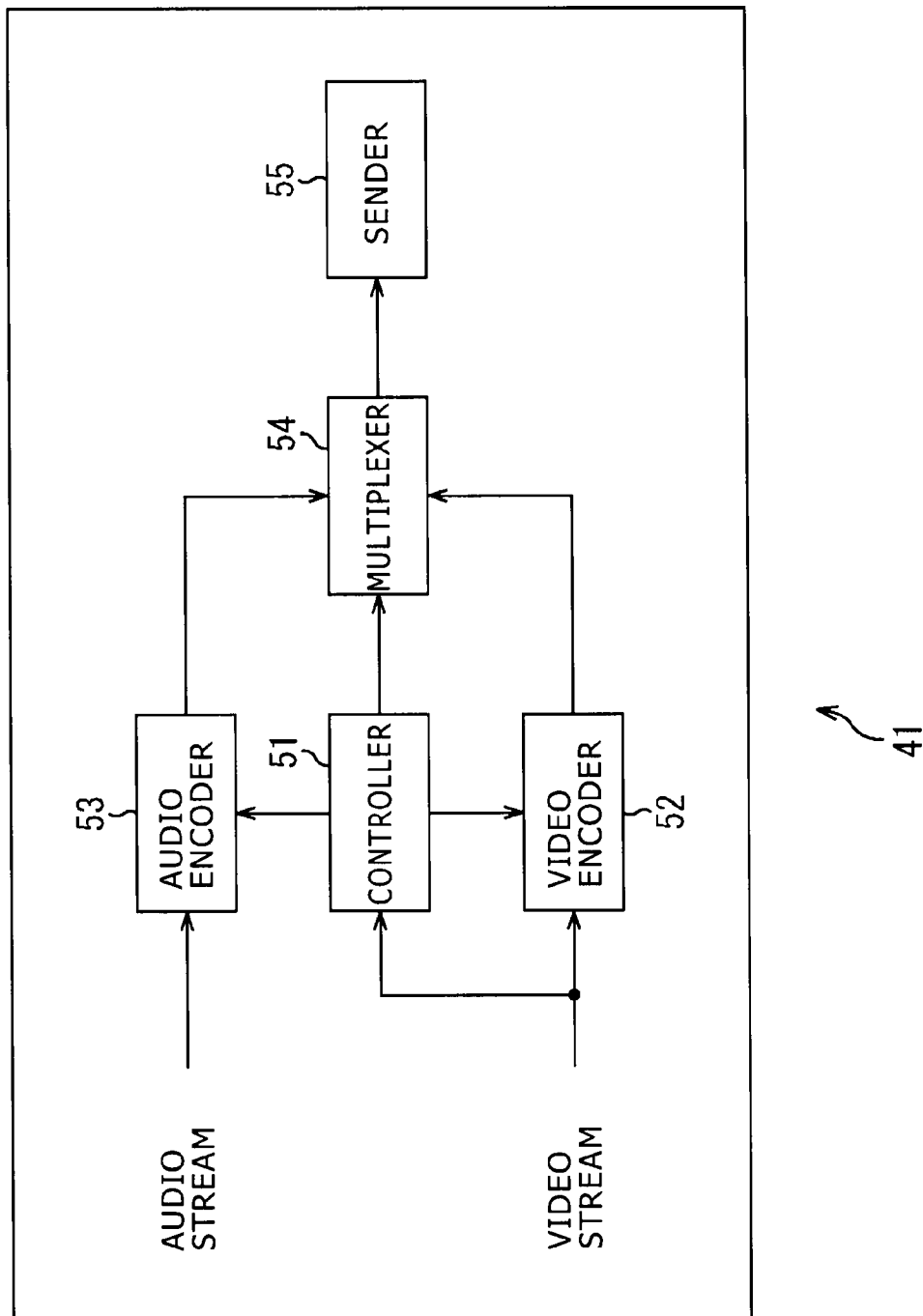
FIG. 4 is a diagram showing a configuration example of a broadcasting device according to the embodiment.

FIG. 4 shows a configuration example of the broadcasting device 41. The broadcasting device 41 includes a controller 51, a video encoder 52, an audio encoder 53, a multiplexer 54, and a sender 55.

The controller 51 generates trigger information in association with the progression of a video stream of show and CM input from the previous stage and outputs it to the video encoder 52 and the multiplexer 54.

Furthermore, the controller 51 generates metadata in which trigger information is stored in association with the progression of the video stream and outputs it to the audio encoder 53 and the multiplexer 54. In the metadata, predetermined information having no direct relation to audio data, such as trigger information, is stored. Details of the metadata will be described later.

The video encoder 52 encodes the video stream of show and CM input from the previous stage in accordance with a predetermined encoding system and outputs the resulting encoded video stream to the multiplexer 54. Examples of the encoding system in the video encoder 52 include MPEG2 system and H.264 system.

In the encoding of the video stream, the video encoder 52 buries the trigger information from the controller 51 in the video stream and encodes the video stream, to output the resulting encoded video stream to the multiplexer 54.

The audio encoder 53 encodes the audio stream corresponding to the video stream input to the video encoder 52 in accordance with a predetermined encoding system and outputs the resulting encoded audio stream to the multiplexer 54. Examples of the encoding system in the audio encoder 53 include AC3 (Audio Code number 3) system and AAC (Advanced Audio Coding) system.

In the encoding of the audio stream, the audio encoder 53 buries the metadata from the controller 51 in the audio stream and encodes the audio stream, to output the resulting encoded audio stream to the multiplexer 54.

The multiplexer 54 multiplexes the input encoded video stream and encoded audio stream and multiplexes also the trigger information or the metadata to output the resulting multiplexed stream to the sender 55. Specifically, the multiplexer 54 multiplexes the streams into e.g. a transport stream (TS). Alternatively, in consideration of network delivery of digital television broadcasting, the multiplexer 54 may multiplex the streams into the ISO base media file format (MP4) suitable for the network delivery.

In the above description, the trigger information is buried in the video stream and the metadata is buried in the audio stream. In addition, the trigger information or the metadata is multiplexed into the multiplexed stream. However, only one of these steps may be carried out. Alternatively, the combination of any of these steps may be carried out.

The sender 55 sends out the input multiplexed stream as a digital television broadcast signal.

[Configuration Example of Receiving Device]

FIG. 5 shows a configuration example of the receiving device 60. The receiving device 60 includes a tuner 61, a demultiplexer 62, an audio decoder 63, an audio output part 64, a video decoder 65, a trigger detector 66, a video output part 67, a controller 68, a memory 69, an operation part 70, a recording part 71, a communication I/F 72, a cache memory 73, an application engine 74, an application memory 75, an HDMI I/F 76, a switch 77, and a switch 78.

The tuner 61 receives and demodulates a digital television broadcast signal corresponding to the channel selected by the user and outputs the resulting TS to the demultiplexer 62. The demultiplexer 62 demultiplexes the TS input from the tuner 61 into an encoded audio stream (audio encoded signal), an encoded video stream (video encoded signal), and a control signal and outputs them to the switch 77, the video decoder 65, or the controller 68.

Furthermore, the demultiplexer 62 extracts a PCR packet including trigger information disposed in the TS and outputs it to the trigger detector 66.

To the HDMI I/F 76, AV content sent from the reproducing device 59 by communication compliant with the HDMI (High Definition Multimedia Interface) is input. The HDMI I/F 76 outputs the encoded audio stream (audio encoded signal) of the AV content from the reproducing device 59 to the switch 77 and outputs a video signal to the switch 78.

As the input from the reproducing device 59 to the HDMI I/F 76, an audio signal is input in the decoded state in some cases, and an audio signal is input in the undecoded state in other cases. The present description will deal with the case in which an encoded audio stream is input.

To the switch 77, the encoded audio stream from the demultiplexer 62 and the encoded audio stream from the HDMI I/F 76 are input. The switch 77 outputs one of the input encoded audio streams to the audio decoder 63 based on a preset instruction from the user.

The audio decoder 63 decodes the input encoded audio stream and outputs the resulting audio stream (audio signal) to the audio output part 64 and the trigger detector 66. The audio output part 64 outputs the input audio signal to the subsequent stage (e.g. speaker).

The video decoder 65 decodes the input encoded video stream and outputs the resulting video stream (video signal) to the trigger detector 66 and the switch 78.

The trigger detector 66 detects the trigger information stored in the metadata buried in the input audio stream and outputs it to the controller 68. Furthermore, the trigger detector 66 detects the trigger information buried in the input video stream and outputs it to the controller 68 (if the trigger information is disposed only in the TS, these operations of the trigger detector 66 are unnecessary). In addition, the trigger detector 66 extracts the trigger information or the trigger information stored in the metadata from the PCR packet including the trigger information, input from the demultiplexer 62, and outputs it to the controller 68.

With omission of the trigger detector 66, the trigger information may be extracted from the audio stream in the audio decoder 63 and the trigger information may be extracted from the video stream in the video decoder 65. In this case, in the demultiplexer 62, the trigger information multiplexed into the multiplexed stream is demultiplexed to be output directly to the controller 68.

To the switch 78, the video signal from the HDMI I/F 76 and the video signal from the video decoder 65 are input. The switch 78 outputs one of the input video signals to the video output part 67 based on a preset instruction from the user.

The video output part 67 outputs the video signal input from the switch 78 to the subsequent stage (e.g. display). Furthermore, the video output part 67 combines the video of data broadcasting content input from the application engine 74 and the video signal input from the video decoder 65 and outputs the resulting signal to the subsequent stage.

The controller 68 runs a control program recorded in the memory 69 to thereby control the whole receiving device 60. Furthermore, the controller 68 controls acquisition, registration, activation, event firing, suspension, resume, stop, and so forth of the data broadcasting application based on the trigger information input from the trigger detector 66.

In the memory 69, the control program run by the controller 68 is recorded. This control program can be updated based on the digital television broadcast signal or update data supplied via the Internet 50. The operation part 70 accepts various kinds of operation from the user and notifies the controller 68 of an operation signal corresponding to the operation.

If the data broadcasting application is delivered by using the digital television broadcast signal, the recording part 71 retains the downloaded data broadcasting application in a recording medium such as a built-in hard disk.

The communication I/F 72 connects to the server 42 via the Internet 50 in accordance with control from the application engine 74. The application engine 74 acquires the data broadcasting application from the server 42 via the communication I/F 72 and the Internet 50 in accordance with control from the controller 68 and makes the cache memory 73 retain it.

The application engine 74 reads out and runs the data broadcasting application retained in the recording part 71 or the cache memory 73 in accordance with control from the controller 68.

The application memory 75 is composed of a work memory 75A and a save memory 75B. The application engine 74 records data relating to the running data broadcasting application (specifically, including the hierarchy of displayed information and so forth) in the work memory 75A. Furthermore, when suspending the running data broadcasting application, the application engine 74 moves the data in the work memory 75A of the application memory 75 to the save memory 75B. When resuming the suspended data broadcasting application, the application engine 74 moves the data in the save memory 75B to the work memory 75A to restore the state before the suspension.

One and the other of two areas having the same size in the application memory 75 may be alternately switched to the work memory 75A and the save memory 75B. This can omit the data movement between the work memory 75A and the save memory 75B.

[Transmitting Method of Trigger Information]

The transmitting method of trigger information will be described below. As the transmitting method of trigger information, the following four kinds of methods are possible.

(a) Method in which Trigger Information is Inserted in PCR Packet (b) Method in which Trigger Information is Buried in Video Signal (c) Method in which Trigger Information is Inserted in Encoded Video Stream (Video Encoded Signal)

(d) Method in which Trigger Information is Inserted in Encoded Audio Stream (Audio Encoded Signal)

Among the above-described methods (a) to (d), in the methods (b) and (c), trigger information is inserted as it is. In the methods (a) and (d), trigger information is inserted with a generic metadata transmission format including information other than the trigger information. In the method (a), trigger information may be inserted as it is.

[Metadata Generic Syntax]

The metadata generic syntax used in the above-described methods (a) and (d) will be described below. FIG. 6 to FIG. 8 show one example of the metadata generic syntax. FIG. 9 shows main data defining contents (semantics) in the metadata generic syntax. In the description of FIG. 6 to FIG. 8, reference to the contents of FIG. 9 is accordingly used.

FIG. 6 shows one example of the syntax of metadata( ).

sync_byte is a unique word indicating metadata container. metadata_type indicates the type information of the metadata. This type information makes it possible to selectively transmit metadata of plural types. For example, 00000011 indicates that the metadata to be transmitted is trigger information.

metadata_length indicates the number of subsequent bytes. metadata_ID is information for identifying the kind in the type of the metadata. This identifier makes it possible to simultaneously transmit plural kinds of information of the same type.

metadata_counter is count information indicating what number divided information the information to be transmitted is when the series of metadata is so transmitted as to be divided. This count information is the count value of the counter incremented every audio frame.

metadata_start_flag indicates whether or not the information to be transmitted is the first divided information when the series of metadata (metadata packet) is so transmitted as to be divided. For example, 1 indicates that the information is the first divided information, and 0 indicates that the information is not the first divided information but the divided information subsequent to the divided information of the previous frame.

sync_control_flag indicates whether or not the metadata is synchronously managed. 1 indicates that the metadata is synchronously managed by PTS in PTS_management( ). 0 indicates that the metadata is not synchronously managed. When sync_control_flag is 1, PTS_management( ) exists.

FIG. 7 shows one example of the syntax of PTS_management( ), and time information indicated by 33 bits of PTS[32-0] exists.

Referring back to FIG. 6, data_byte for the number of bytes indicated by metadata_length configures the whole of the metadata packet Metadata_packet( ) or any piece of divided information obtained by dividing this metadata packet Metadata_packet( ) into plural pieces of information.

FIG. 8 shows one example of the syntax of metadata_packet( ).

packet_type indicates the type information of the metadata similarly to metadata_type of metadata( ) (FIG. 6). metadata_packet_length indicates the number of subsequent bytes. In data_byte for the number of bytes indicated by this metadata_packet_length, the whole of metadata_packet( ) is described.

For example, if information stored in the metadata is trigger information, metadata_Packet( ) of the trigger information, i.e. Trigger_info_data( ) (FIG. 25, FIG. 37) to be described later, is described in this data_byte.

The information stored in the metadata may be information other than the trigger information. For example, other service access information (Metadata for linking service) and disparity information (Metadata for disparity shifting data) can be stored. Details of the other service access information and the disparity information are described in e.g. Japanese Patent Application No. 2011-061549, which is an application by the present assignee.

[(a) Method in which Trigger Information is Inserted in PCR Packet]

Figure 10:
FIG. 10 is a diagram showing a concept that trigger information is so transmitted as to be included in a PCR packet of a TS.

Details of the respective transmitting methods of trigger information will be described below. FIG. 10 shows the concept of the case in which trigger information is so transmitted as to be disposed in a PCR (Program Clock Reference) packet of the TS of a digital television broadcast signal.

As shown in FIG. 10, the trigger information is not stored in all PCR packets but stored in a PCR packet only at the proper timing for linkage to AV content (show, CM, etc.). In general, the PCR packet passes through the PID filter 12 of the CATV retransmission device 2 like that shown in FIG. 2 and thus a receiving device utilizing a CATV network (digital television receiver 4 in FIG. 2) can also be notified of the trigger information.

As the trigger information, information of the same contents is transmitted plural times successively in consideration of radio interference and acquisition imperfection (reception miss) in the receiving device 60.

FIG. 11 shows the position at which trigger information is stored in the PCR packet. The PCR packet is a TS packet with adaptation_field in which PCR is stored. The trigger information (Trigger Info_descriptor) is stored in transport_private_data_byte following the PCR. If the trigger information is stored, transport_private_data_flag of Various_flags provided before the PCR is set to 1.

As shown in FIG. 12, trigger information may be stored in metadata and the metadata may be stored in transport_private_data_byte. Also in this case, transport_private_data_flag of Various_flags is set to 1.

In this manner, in the method (a), in which trigger information is inserted in a PCR packet, the trigger information or metadata in which the trigger information is stored is stored in transport_private_data_byte of the PCR packet.

[(b) Method in which Trigger Information is Buried in Video Signal]

Figure 13B:
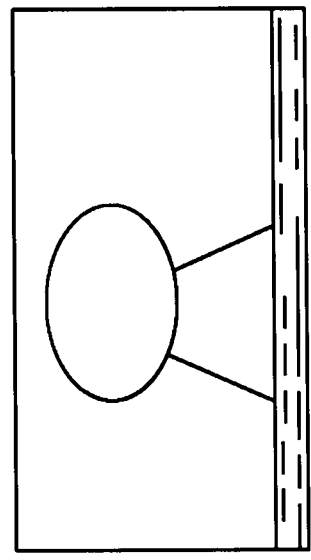
FIGS. 13A and 13B are diagrams showing an example in which trigger information is buried in a video signal.
Figure 13A:
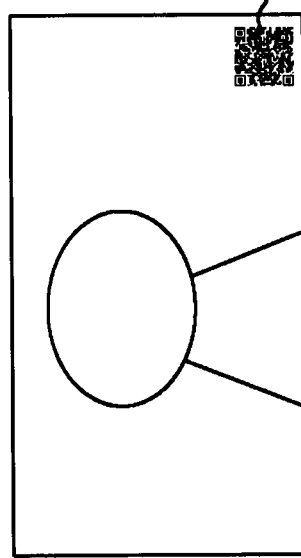

FIGS. 13A and 13B show two kinds of examples in which trigger information is buried in a video signal.

FIG. 13A shows an example in which trigger information is turned to a two-dimensional barcode and is so combined as to be superimposed onto a predetermined position (in the present case, lower right corner) of the image of the video signal. FIG. 13B shows an example in which trigger information is turned to a video code and combined with several lines at the lower part of the image of the video signal. The trigger information in FIG. 13A and FIG. 13B is detected by the trigger detector 66 of the receiving device 60.

In either example of FIG. 13A or FIG. 13B, the trigger information is disposed on the video of AV content and thus e.g. a receiving device utilizing a CATV network (e.g. television receiver 6 in FIG. 2) can also be notified of the trigger information.

Furthermore, in either example of FIG. 13A or FIG. 13B, possibly the trigger information (two-dimensional barcode or video code) on the video is visually recognized by the user of the receiving device 60. If this is not preferable, it is preferable to display the video after masking the trigger information on the video by the same pixels as those around the trigger information.

In this manner, in the method (b), in which trigger information is buried in a video signal, the trigger information is buried in a predetermined area of the image of the video signal.

[(c) Method in which Trigger Information is Inserted in Encoded Video Stream]

FIG. 14 and FIG. 15 show an example of the case in which trigger information is inserted in an encoded video stream (video encoded signal) of MPEG2.

FIG. 14 shows the configuration of video_sequence( ) defined in MPEG2 video.

If trigger information is inserted in an encoded video stream of MPEG2, user_data in the picture layer in video_sequence( ) is utilized.

FIG. 15 shows one example of the syntax of user_data( ).

In user_data_start_code, 0x000001B2 is described as a fixed value. In Trigger_Info_Data_identifier, 0x54524749 ("TRGI") is described as a fixed value.

In Trigger_info_data( ), trigger information, i.e. Trigger_info_data( ) (FIG. 25, FIG. 37) to be described later, is described.

In this manner, in the method (c), in which trigger information is inserted in an encoded video stream, the trigger information is inserted in an area of user_data( ) of video_sequence( ).

[(d) Method in which Trigger Information is Inserted in Encoded Audio Stream]

Figure 16:
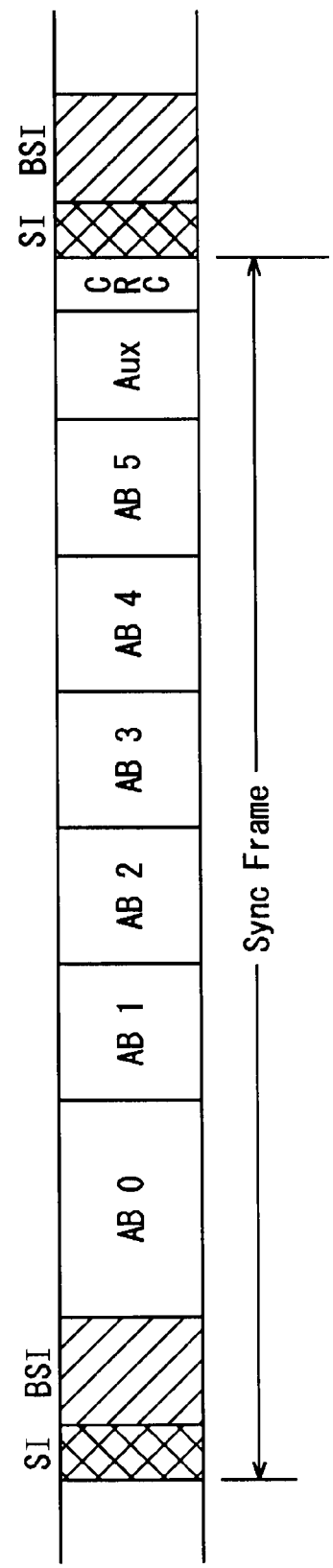
FIG. 16 is a diagram showing the configuration of a frame of AC3.

FIG. 16 and FIG. 17 show an example of the case in which metadata in which trigger information is stored is inserted in an encoded audio stream (audio encoded signal) encoded by the AC3 system.

FIG. 16 shows the structure of the frame of AC3 (AC3 Synchronization Frame). If the encoding system is the AC3 system, the metadata is inserted in an area of AUX (AUXILIARY DATA).

FIG. 17 shows one example of the syntax of AUX. When auxdatae is 1, aux data is enabled and data having the size indicated by 14 bits (bit unit) of auxdata1 is defined in auxbits. The size of auxbits is described in nauxbits. The space of auxbits is defined as metadata( ) and trigger information is inserted.

Figure 18:
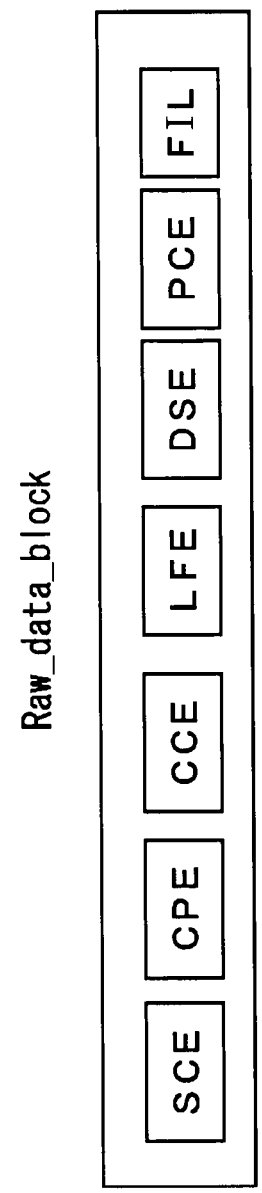
FIG. 18 is a diagram showing the configuration of a frame of AAC.

FIG. 18 and FIG. 19 show an example of the case in which metadata in which trigger information is stored is inserted in an encoded audio stream encoded by the AAC system.

FIG. 18 shows the structure of the frame in which audio data for 1024 samples of AAC are stored (Raw_data_block). If the encoding system is the AAC system, the metadata is inserted in an area of DSE (Data Stream Element).

FIG. 19 shows one example of the syntax of DSE. element_instance_tag indicates the kind of data in data_stream_element. If DSE is utilized as unified user data, the value of element_instance_tag may be set to 0. Data_byte_align_flag is set to 1 so that the whole of DSE may be subjected to byte align. The value of count or esc_count, which means the number of added bytes of count, is accordingly decided depending on the size of the user data. The space of data_stream_byte is defined as metadata( ) and trigger information is inserted.

In this manner, in the method (d), in which trigger information is inserted in an encoded audio stream, metadata in which the trigger information is stored is inserted in an area of AUX if encoding is performed by the AC3 system, and is inserted in an area of DSE if encoding is performed by the AAC system. Although the cases in which the AC3 system and the AAC system are employed as the encoding system have been described, it is also possible to apply this method to another encoding system.

[Details of Trigger Information]

Details of trigger information will be described below. The trigger information is classified into five kinds depending on the kind of command included in the trigger information.

Two combinations of five kinds of commands have been proposed. The first combination (hereinafter, referred to as first embodiment) is composed of commands of Pre_cache, Execute, Inject_event, Suspend, and Terminate. The second combination (hereinafter, referred to as second embodiment) is composed of commands of Register, Execute, Inject_event, Suspend, and Terminate.

First, five kinds of commands in the first embodiment will be described. The second embodiment will be described later with reference to FIG. 32 and subsequent diagrams.

[First Example of Five Kinds of Commands]

FIG. 20 shows items included in trigger information as the Pre_cache command. The Pre_cache command is a command for instructing the receiving device 60 to acquire a data broadcasting application.

Trigger_id is information for identification of this trigger information. If trigger information of the same contents is transmitted plural times, Trigger_id of the respective pieces of trigger information is the same. Protocol_version indicates the version of the protocol of this trigger information. Command_code indicates the kind of command of this trigger information. In the case of FIG. 20, information indicating that the command is the Pre_cache command is described in Command_code.

Trigger_validity is a parameter value N of server access distribution indicating the probability that the respective receiving devices 60 that have received this trigger information execute processing in accordance with this trigger information. Due to the provision of this value, in acquisition of a data broadcasting application by the plural receiving devices 60 from the server 42, the access can be distributed without concentrating on one period. For example, to distribute access from the receiving devices 60, which possibly exist in large numbers, to the server 42 into four times of access, the same trigger information is transmitted four times and the parameter N of server access distribution is set as follows. Specifically, the parameter N in the trigger information of the first round is set to 4, and the parameter N in the trigger information of the second round is set to 3. In addition, the parameter N in the trigger information of the third round is set to 2, and the parameter N in the trigger information of the fourth round is set to 1.

App_id is identification information of the data broadcasting application acquired corresponding to this trigger information. App_type is information indicating the type (e.g. HTML5, java) of the data broadcasting application corresponding to this trigger information. App_url is the URL of the acquisition source of the data broadcasting application.

Broadcast_App_flag, Downloaded_App_flag, and Internet_App_flag are flags indicating where the data broadcasting application corresponding to this trigger information exists. Broadcast_App_flag is set to 1 if the data broadcasting application corresponding to this trigger information can be acquired from a digital television broadcast signal. Downloaded_App_flag is set to 1 if the data broadcasting application corresponding to this trigger information has been already downloaded and can be acquired from a local storage (e.g. recording part 71). Internet_App_flag is set to 1 if the data broadcasting application corresponding to this trigger information can be acquired from the server 42 via the Internet 50.

FIG. 21 shows items included in trigger information as the Execute command. The Execute command is a command for instructing the receiving device 60 to activate a data broadcasting application.

Trigger_id, Protocol_version, Command_code, Trigger_validity, App_id, App_type, App_url, Broadcast_App_flag, Downloaded_App_flag, and Internet_App_flag are the same as those of the trigger information as the Pre_cache command shown in FIG. 20. However, in Command_code, information indicating that the command is the Execute command is described.

App_life_scope indicates the range in which the running state is continued without stopping the running data broadcasting application when switching of e.g. the channel occurs. App_expire_date indicates the time and date when the running data broadcasting application is stopped although the Terminate command is not received.

FIG. 22 indicates items included in trigger information as the Inject_event command. The Inject_event command is a command for making the receiving device 60 fire an event in the running data broadcasting application.

Trigger_id, Protocol_version, Command_code, Trigger_validity, App_id, and App_type are the same as those of the trigger information as the Pre_cache command shown in FIG. 20. However, in Command_code, information indicating that the command is the Inject_event command is described.

Event_id is identification information of the event that should be fired in the data broadcasting application specified by App_id. In Event Embedded Data, the data used as reference in event firing is described.

FIG. 23 shows items included in trigger information as the Suspend command. The Suspend command is a command for making the receiving device 60 suspend the running data broadcasting application.

Trigger_id, Protocol_version, Command_code, Trigger_validity, App_id, and App_type are the same as those of the trigger information as the Pre_cache command shown in FIG. 20. However, in Command_code, information indicating that the command is the Suspend command is described.

FIG. 24 shows items included in trigger information as the Terminate command. The Terminate command is a command for making the receiving device 60 stop the running data broadcasting application.

Trigger_id, Protocol_version, Command_code, Trigger_validity, App_id, and App_type are the same as those of the trigger information as the Pre_cache command shown in FIG. 20. However, in Command_code, information indicating that the command is the Terminate command is described.

FIG. 25 shows one example of the syntax of trigger information compatible with the trigger information as the above-described respective commands. However, the syntax of trigger information may be any syntax and is not limited to the example of FIG. 25.

[Outline of Operation of Receiving Device 60]

The operation of the receiving device 60 in accordance with trigger information will be described below.

FIG. 26 shows the transition of the display screen of the receiving device 60 when the receiving device 60 is made to run a data broadcasting application corresponding to AV content (show, CM, etc.).

For example, as shown in FIG. 26A, a show (in the present case, "seven o'clock news") is broadcast. When the contents of the show transition to economic information, in conjunction with this transition, trigger information of the Execute command for the data broadcasting application corresponding to the show is transmitted. When the trigger information is received by the receiving device 60, the data broadcasting application is activated, and an icon for notifying the user that displaying of the data broadcasting application is ready (in the present case, "stock") is displayed on the screen on which the show is being displayed as shown in FIG. 26B.

If the user selects this icon, as shown in FIG. 26C, displaying by the data broadcasting application (in the present case, displaying of stock price information) is carried out on the screen. In this manner, displaying by the data broadcasting application is carried out only when the icon displayed on the screen is selected by the user. This can prevent the situation in which the user who does not need the displaying by the data broadcasting application is bothered.

When the contents of the show further transition (in the present case, transition to sports information), trigger information of the Inject_event command is transmitted in conjunction with this transition. When this trigger information is received, an event is fired, and the displaying by the data broadcasting application on the screen is changed as shown in FIG. 26D for example (in the present case, changed to displaying of game result information).

Thereafter, prior to CM broadcasting, trigger information of the Suspend command for the running data broadcasting application corresponding to the show is transmitted. When this trigger information is received, the data broadcasting application corresponding to the show is suspended. Thereafter, trigger information of the Execute command for the data broadcasting application corresponding to the CM is transmitted. When this trigger information is received, the data broadcasting application of the CM is activated. Thereby, as shown in FIG. 26E, an icon for encouraging the user to display the data broadcasting application corresponding to the CM (in the present case, "participate in prize competition") is displayed on the screen on which the CM is being displayed.

If the user selects this icon, displaying by the data broadcasting application corresponding to the CM (in the present case, displaying for participation in prize competition) is carried out on the screen.

After the end of the CM, in synchronization with show resumption, trigger information of the Execute command for the data broadcasting application corresponding to the show is transmitted. When the trigger information is received, as shown in FIG. 26F, the displaying of the data broadcasting application corresponding to the CM is erased and displaying of the data broadcasting application of the show is resumed from the state stopped in the previous suspension.

When the show ends, in conjunction with this end, trigger information of the Terminate command for the data broadcasting application corresponding to the show is transmitted. When this trigger information is received, the data broadcasting application is stopped, and the displaying of the data broadcasting application is erased from the screen and only the video of the show is displayed as shown in FIG. 26G.

The method for displaying the data broadcasting application is not limited to the method in which displaying of the show is reduced to make the area for displaying of the data broadcasting application as shown in FIG. 26. For example, displaying of the data broadcasting application may be superimposed on displaying of the show.

[Trigger Information Transmission Processing]

Figure 27:
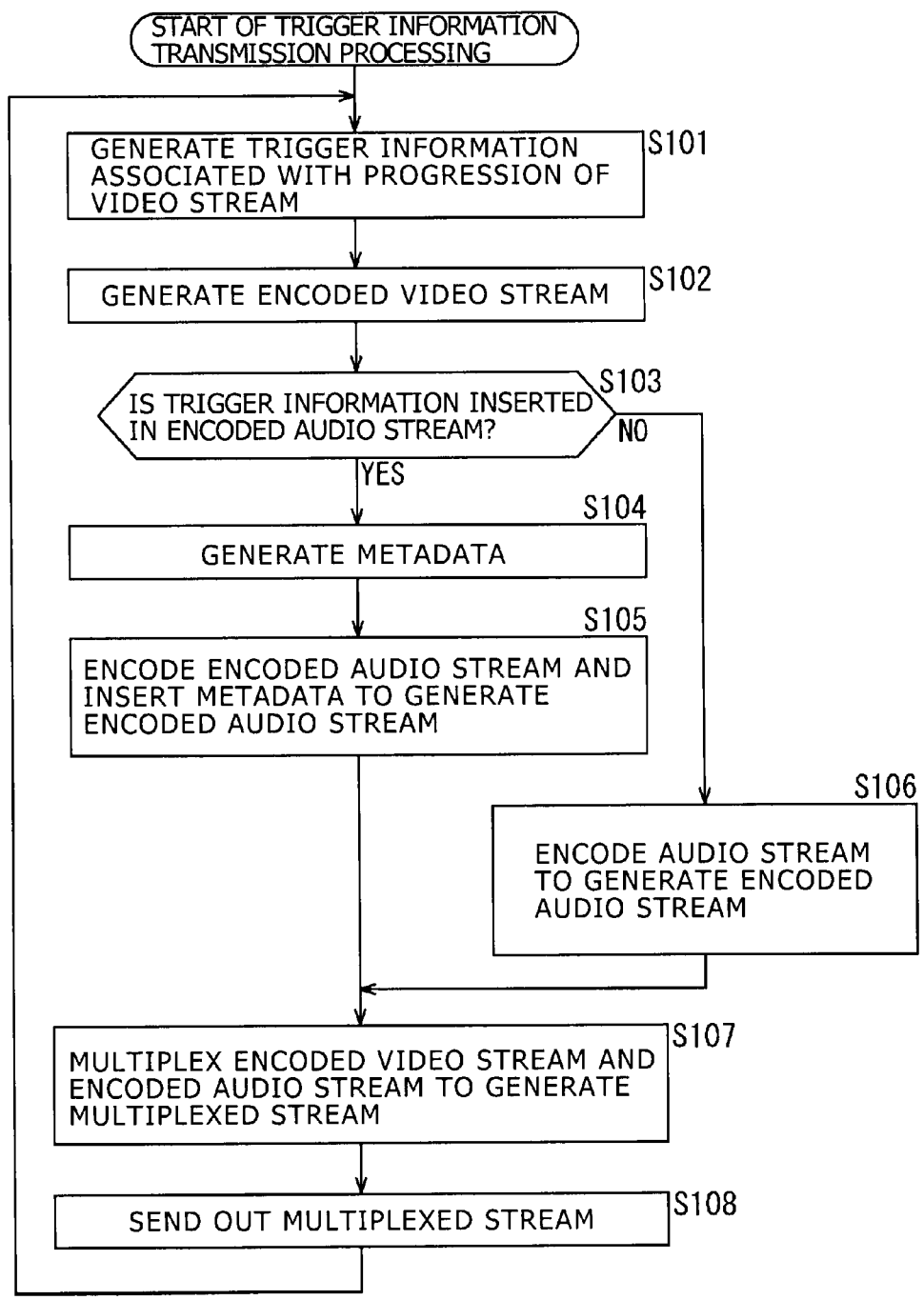
FIG. 27 is a flowchart for explaining trigger information transmission processing.

With reference to FIG. 27, a description will be made below about trigger information transmission processing when the broadcasting device 41 makes trigger information be included in a digital television broadcast signal and transmits this broadcast signal.

FIG. 27 is a flowchart for explaining the trigger information transmission processing.

In a step S101, the controller 51 generates trigger information associated with the progression of a video stream of show and CM input from the previous stage.

In a step S102, the video encoder 52 encodes the video stream of show and CM input from the previous stage and outputs the resulting encoded video stream to the multiplexer 54.

In a step S103, the controller 51 determines whether or not to insert the trigger information in an encoded audio stream based on a preset instruction from the user.

If it is determined to insert the trigger information in the encoded audio stream, the processing is forwarded to a step S104. In the step S104, the controller 51 generates metadata based on the trigger information and outputs the metadata to the audio encoder 53 together with size information for burying this metadata in the user data area.

In a step S105, the audio encoder 53 encodes an audio stream and inserts the metadata from the controller 51 in the audio stream based on the size information from the controller 51, to output the resulting encoded audio stream to the multiplexer 54.

For example, if the encoding system is the AC3 system (FIG. 16), the controller 51 supplies information of size S=(frmsizcod−AUXDATA) to the audio encoder 53. frmsizcod is the size of the AC3 audio frame and a value dependent on the bit rate and the sampling frequency is specified as frmsizcod. For example, the value is 384*2 Bytes if the bit rate is 128 kbps and the sampling frequency is 32 kHz. The value is 279*2 Bytes if the bit rate is 128 kbps and the sampling frequency is 44.1 kHz. The value is 256*2 Bytes if the bit rate is 128 kbps and the sampling frequency is 48 kHz.

The audio encoder 53 performs the encoding with the aim at the size S as the target value, and encodes audio data in such a manner that the total size of mantissa data of Audblock 5, AUX, and CRC does not surpass ⅜ of the whole. Furthermore, the audio encoder 53 inserts the metadata in an area of AUX and makes CRC to complete the stream. Thereby, in the area of AUX (AUXILIARY DATA) in FIG. 17, the metadata in which the trigger information is stored is inserted in the space of auxbits.

If the encoding system is the AAC system (FIG. 18) for example, the controller 51 supplies, to the audio encoder 53, information of the size DSE_S=cnt of DSE (Data Stream Element) in which the metadata should be inserted. The audio encoder 53 encodes audio data and adds DSE in which the metadata is inserted to complete the stream. Thereby, in the area of DSE in FIG. 19, the metadata in which the trigger information is stored is inserted in the space of data_stream_byte.

It is also possible for the audio encoder 53 to perform the encoding twice in a divided manner. In this case, first the audio encoder 53 performs normal encoding, i.e. encoding for the case in which DSE or AUX is absent, and thereafter inserts the metadata in DSE or AUX with the size reserved in advance and performs encoding again.

In the above-described manner, in the audio encoder 53, processing for burying the metadata in the user data area of the encoded audio stream (e.g. AUX in the case of the AC3 system or DSE in the case of the AAC system) is executed, and the processing is forwarded to a step S107.

If it is determined in the step S103 not to insert the trigger information in the encoded audio stream, the processing is forwarded to a step S106. In the step S106, the audio encoder 53 encodes the audio stream and outputs the resulting encoded audio stream to the multiplexer 54. Thereafter, the processing is forwarded to the step S107.

In the step S107, the multiplexer 54 multiplexes the encoded video stream output from the video encoder 52 and the encoded audio stream output from the audio encoder 53 and outputs the resulting multiplexed stream to the sender 55.

In a step S108, the sender 55 sends out (transmits) the multiplexed stream input from the multiplexer 54 as a digital television broadcast signal. Thereafter, the processing is returned to the step S101, so that this and subsequent steps are repeated. This is the end of the description of the trigger information transmission processing.

In the above description of the trigger information transmission processing, among the above-described methods (a) to (d) for transmitting trigger information, the method (d), in which trigger information is inserted in an encoded audio stream, is explained. However, trigger information and metadata can be buried also in the methods (a) to (c) similarly. For example, if the method (a) is employed, trigger information or metadata is inserted in a PCR packet in the multiplexing by the multiplexer 54. If the method (b) is employed, trigger information is buried in a video signal of a video stream. If the method (c) is employed, trigger information is inserted in an encoded video stream in the encoding by the video encoder 52.

[Trigger Information Response Processing]

Trigger information response processing when the receiving device 60 receives trigger information will be described below with reference to FIG. 28.

Figure 28:
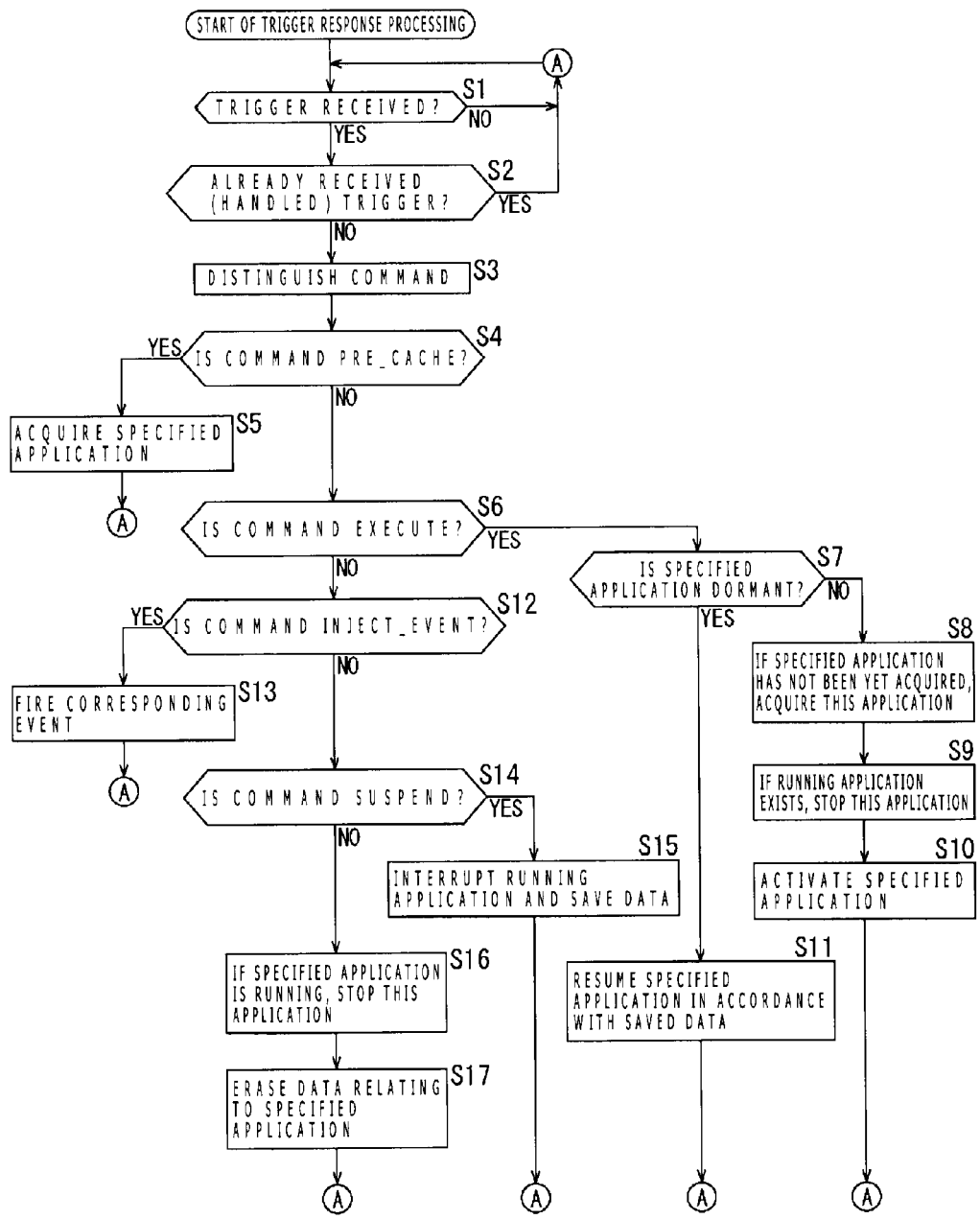
FIG. 28 is a flowchart for explaining trigger information response processing.

FIG. 28 is a flowchart for explaining the trigger information response processing. This trigger information response processing is repeatedly executed when the user is watching a television show, i.e. while a digital television broadcast signal is received.

In a step S1, the trigger detector 66 determines whether or not trigger information is received.

As the condition of this determination, if the above-described method (a) is employed, the trigger detector 66 waits until a PCR packet including trigger information is input from the demultiplexer 62. If the method (b) or (c) is employed, the trigger detector 66 waits until trigger information is detected from a video signal output from the video decoder 65. If the method (d) is employed, the trigger detector 66 waits until trigger information stored in metadata is detected from an audio signal output from the audio decoder 63. If a PCR packet including trigger information is input or trigger information is detected, the processing is forwarded to a step S2.

In the step S2, the trigger detector 66 outputs the trigger information to the controller 68. The controller 68 reads out Trigger_id of the trigger information and determines whether or not the processing of a step S3 and subsequent steps has been already executed for this trigger information. If it is determined that the processing of the step S3 and subsequent steps has been already executed, the processing is returned to the step S1, so that this and subsequent steps are repeated. In contrast, if it is determined that the processing of the step S3 and subsequent steps has not been executed for this trigger information, the processing is forwarded to the step S3.

In the step S3, the controller 68 reads out Command_code of the trigger information and determines which of the following the command indicated by this trigger information is: Pre_cache, Execute, Inject_event, Suspend, and Terminate.

In a step S4, the controller 68 determines whether or not the determination result of the step S3 is Pre_cache. If it is determined that the determination result is Pre_cache, the processing is forwarded to a step S5.

In the step S5, the controller 68 causes acquisition of the data broadcasting application specified by App_id of this trigger information. Specifically, if Broadcast_App_flag of this trigger information is 1, the data broadcasting application specified by App_id is acquired from a television broadcast signal and recorded in the recording part 71. If Downloaded_App_flag of this trigger information is 1, the data broadcasting application specified by App_id is acquired from the recording part 71 as a local storage. If Internet_App_flag of this trigger information is 1, the data broadcasting application specified by App_id is acquired from the server 42 via the Internet 50 and recorded in the cache memory 73. If two or more flags of Broadcast_App_flag, Downloaded_App_flag, and Internet_App_flag are 1, the data broadcasting application specified by App_id of this trigger information can be acquired depending on convenience for the receiving device 60. Thereafter, the processing is returned to the step S1, so that this and subsequent steps are repeated.

If it is determined in the step S4 that the determination result of the step S3 is not Pre_cache, the processing is forwarded to a step S6. In the step S6, the controller 68 determines whether or not the determination result of the step S3 is Execute. If it is determined that the determination result is Execute, the processing is forwarded to a step S7.

In the step S7, the application engine 74 determines whether or not the data broadcasting application specified by App_id of this trigger information is dormant (in the suspended state) in accordance with control from the controller 68. Specifically, it is determined that the data broadcasting application is dormant if data indicating the suspended state of the data broadcasting application specified by App_id is saved in the save memory 75B.

If it is determined in the step S7 that the data broadcasting application specified by App_id is not dormant, the processing is forwarded to a step S8. In the step S8, in accordance with control from the controller 68, the application engine 74 acquires the data broadcasting application specified by App_id if this data broadcasting application has not yet been acquired (does not exist in the recording part 71 or the cache memory 73).

In a step S9, if a currently-running data broadcasting application exists, the application engine 74 stops it in accordance with control from the controller 68.

In a step S10, the application engine 74 activates the data broadcasting application specified by App_id in accordance with control from the controller 68. Thereafter, the processing is returned to the step S1, so that this and subsequent steps are repeated.

If it is determined in the step S7 that the data broadcasting application specified by App_id is dormant (in the suspended state), the processing is forwarded to a step S11. In the step S11, the application engine 74 moves data in the save memory 75B to the work memory 75A and activates the data broadcasting application specified by App_id in accordance with control from the controller 68. Thereby, the dormant data broadcasting application specified by App_id is resumed from the suspended state. Thereafter, the processing is returned to the step S1, so that this and subsequent steps are repeated.

If it is determined in the step S6 that the determination result of the step S3 is not Execute, the processing is forwarded to a step S12. In the step S12, the controller 68 determines whether or not the determination result of the step S3 is Inject_event. If it is determined that the determination result is Inject_event, the processing is forwarded to a step S13.

In the step S13, only when App_id of this trigger information corresponds with App_id of the running data broadcasting application, the controller 68 controls the application engine 74 to fire (execute) the event corresponding to Event_id of the trigger information in the running application. Thereafter, the processing is returned to the step S1, so that this and subsequent steps are repeated.

If it is determined in the step S12 that the determination result of the step S3 is not Inject_event, the processing is forwarded to a step S14. In the step S14, the controller 68 determines whether or not the determination result of the step S3 is Suspend. If it is determined that the determination result is Suspend, the processing is forwarded to a step S15.

In the step S15, the application engine 74 saves, in the save memory 75B, data indicating the state of the currently-running data broadcasting application (i.e. data currently written to the work memory 75A, including information indicating the hierarchy of the displayed information if a hierarchical structure exists in the displayed information) in accordance with control from the controller 68. Thereafter, the processing is returned to the step S1, so that this and subsequent steps are repeated.

If it is determined in the step S14 that the determination result of the step S3 is not Suspend, the determination result of the step S3 is Terminate and thus the processing is forwarded to a step S16. In the step S16, if the data broadcasting application specified by App_id is running, the application engine 74 stops it in accordance with control from the controller 68. In a step S17, in accordance with control from the controller 68, the application engine 74 erases data relating to the data broadcasting application specified by App_id from the work memory 75A and the save memory 75B and erases the data broadcasting application from the recording part 71 or the cache memory 73. Thereafter, the processing is returned to the step S1, so that this and subsequent steps are repeated.

This is the end of the description of the trigger information response processing. The above-described trigger information response processing enables activation of a data broadcasting application, event firing, and stop of the data broadcasting application in conjunction with AV content (show, CM, etc.) of television broadcasting. Furthermore, a data broadcasting application can be suspended in such a manner that the state immediately before suspend is held, and another data broadcasting application can be executed and stopped. Thereafter, the suspended data broadcasting application can be resumed from the suspended state.

[Operation Scenario]

Figure 29:
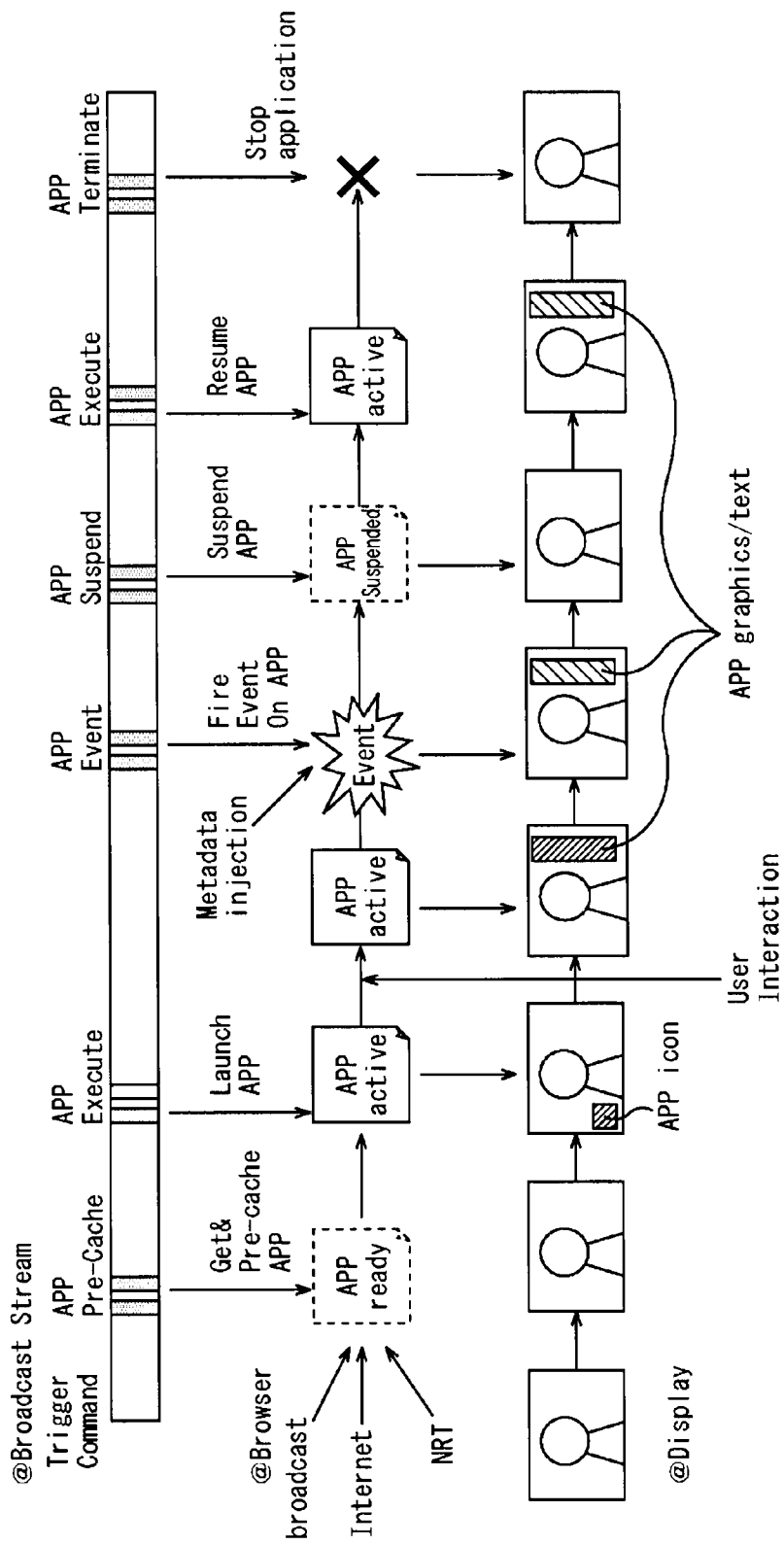
FIG. 29 is a diagram showing one example of the operation scenario of an application program.

The above-described trigger information response processing enables operation of a data broadcasting application like that shown in FIG. 29.

FIG. 29 shows one example of the operation scenario of a data broadcasting application.

The broadcasting device 41 transmits trigger information of the Pre_cache command instructing acquisition of the data broadcasting application corresponding to a show in conjunction with the progression of the show. Thereupon, the data broadcasting application is acquired in the receiving device 60 that has received the trigger information.

Next, the broadcasting device 41 transmits trigger information of the Execute command for the data broadcasting application corresponding to the show in conjunction with the progression of the show. Thereupon, the data broadcasting application is launched in the receiving device 60 that has received the trigger information. By this launch, an icon indicating that displaying of the data broadcasting application is ready is so displayed as to be superimposed on the video of the show.

If the user selects this icon, displaying by the data broadcasting application is superimposed on the video of the show on the screen.

The broadcasting device 41 transmits trigger information of the Inject_event command in conjunction with the progression of the show. Thereupon, in the receiving device 60 that has received the trigger information, an event is fired in the running data broadcasting application (e.g. displaying is changed).

Subsequently, at a predetermined timing, the broadcasting device 41 transmits trigger information of the Suspend command for the data broadcasting application.

Thereupon, in the receiving device 60 that has received the trigger information, the running data broadcasting application is suspended (relevant data is retained in the save memory 75B). Thereafter, the broadcasting device 41 transmits trigger information of the Execute command for the data broadcasting application. Thereupon, in the receiving device 60 that has received the trigger information, the suspended data broadcasting application is resumed.

Furthermore, the broadcasting device 41 transmits trigger information of the Terminate command in conjunction with the end of the show. Thereupon, in the receiving device 60 that has received the trigger information, the running data broadcasting application is stopped.

[First State Transition of Data Broadcasting Application]

FIG. 30 is a state transition diagram of a data broadcasting application that operates in the receiving device 60 in response to the respective commands of Pre_cache, Execute, Inject_event, Suspend, and Terminate, which are the first example of five kinds of commands.

As shown in FIG. 30, it is defined that the state of the data broadcasting application has transitioned to one of four kinds of states, i.e. Stopped state, Ready state, Active state, and Suspended state.

The Stopped state refers to the state in which the data broadcasting application has not yet been acquired into the receiving device 60. The Ready state refers to the state in which the data broadcasting application has been acquired into the receiving device 60 and is not activated. The Active state refers to the state in which the data broadcasting application is activated and running. The Suspended state refers to the state in which the execution of the data broadcasting application is interrupted and information indicating the state of the interruption timing is retained in the save memory 75B.

When the data broadcasting application has transitioned to the Stopped state (has not yet been acquired into the receiving device 60), transition to the Ready state occurs if trigger information of the Pre_cache command is received and the data broadcasting application is acquired in accordance with the Pre_cache command.

When the data broadcasting application is in the Ready state, transition to the Active state occurs if trigger information of the Execute command is received and the data broadcasting application is activated in accordance with the Execute command.

When the data broadcasting application has transitioned to the Stopped state (has not yet been acquired into the receiving device 60), transition to the Active state occurs if trigger information of the Execute command is received and the data broadcasting application is acquired and activated in accordance with the Execute command.

When the data broadcasting application has transitioned to the Active state, transition to the Suspended state occurs if trigger information of the Suspend command is received and the running data broadcasting application is interrupted in accordance with the Suspend command.

When the data broadcasting application has transitioned to the Suspended state, transition to the Active state occurs if trigger information of the Execute command is received and the interrupted data broadcasting application is resumed in accordance with the Execute command.

When the data broadcasting application has transitioned to the Ready state, the Active state, or the Suspended state, transition to the Stopped state occurs if trigger information of the Terminate command is received and the data broadcasting application is stopped in accordance with the Terminate command. The transition to the Stopped state is not limited to transition based on trigger information of the Terminate command. The transition to the Stopped state occurs also when App_expire_date of trigger information passes, when another data broadcasting application is executed, and when switching of the reception channel is beyond App_life_scope.

[State Transition of Plural Data Broadcasting Applications]

The state transition of plural data broadcasting applications that can be sequentially executed in the receiving device 60 will be described below.

FIG. 31 shows one example of the operation scenario when the plural data broadcasting applications are sequentially executed. Hereinafter, three data broadcasting applications will be referred to as data broadcasting applications A, B, and C.

When a show is started, the data broadcasting applications A, B, and C are all in the Stopped state. When the Execute command for the data broadcasting application A is received, the data broadcasting application A is acquired and activated to become the Active state. At this time, in the work memory 75A, data relating to the data broadcasting application A is written.

Next, when the Suspend command for the data broadcasting application A is received, the data relating to the data broadcasting application A, written to the work memory 75A, is moved to the save memory 75B and the data broadcasting application A becomes the Suspended state. Thereafter, when the Execute command for the data broadcasting application B is received, the data broadcasting application B is acquired and activated to become the Active state. At this time, in the work memory 75A, data relating to the data broadcasting application B is written.

If the Pre_cache command for the data broadcasting application C is received when the data broadcasting application B is in the Active state, the data broadcasting application C is acquired to become the Ready state.

Next, when the Execute command for the data broadcasting application A is received, because the data broadcasting application A is in the Suspended state, the data relating to the data broadcasting application A is moved from the save memory 75B to the work memory 75A and the data broadcasting application A is resumed. The data broadcasting application B is stopped.

Thereafter, when the Execute command for the data broadcasting application C in the Ready state is received, the data broadcasting application C is read out and activated to become the Active state. In the work memory 75A, data relating to the data broadcasting application C is written. The data broadcasting application A is stopped.

As described above, plural data broadcasting applications can be sequentially executed in the receiving device 60 and a suspended data broadcasting application can also be resumed from the suspended state.

2. Second Embodiment

Second Example of Five Kinds of Commands

The second embodiment will be described below. As described above, five kinds of commands in the second embodiment are the commands of Register, Execute, Inject_event, Suspend, and Terminate.

FIG. 32 shows items included in trigger information as the Register command in the second embodiment. The Register command is a command for instructing the receiving device 60 to acquire and register a data broadcasting application.

Specifically, this Register command is the same as the Pre_cache command in the first embodiment in that it instructs acquisition of a data broadcasting application, but is different in that it instructs also registration of the data broadcasting application. The registration of a data broadcasting application means that the priority (Persistent_priority) and retention time limit (Expire_date) of the acquired data broadcasting application are stored in association with this data broadcasting application. The stored data broadcasting application is managed in accordance with the priority and the retention time limit by the controller 68 (details will be described later).

Trigger_id, Protocol_version, Command_code, Trigger_validity, and App_type are the same as those of the trigger information as the Pre_cache command shown in FIG. 20. However, in Command_code, information indicating that the command is the Register command is described.

App_id in the second embodiment is identification information of the data broadcasting application acquired corresponding to this trigger information and also indicates the URL of the acquisition source thereof (in the present case, server 42). In other words, the acquisition source of the data broadcasting application is diverted also to the identification information thereof and set as App_id. Therefore, in the trigger information as the Register command, the item of App_url, which exists in the trigger information as the Pre_cache command shown in FIG. 20, is omitted. However, App_url may be included in the trigger information as the Register command.

Persistent_priority indicates the priority of acquisition and retention of the corresponding data broadcasting application. In the present case, two bits are allocated to Persistent_priority and thus four levels of priority can be given. In acquisition and retention of the corresponding data broadcasting application, if the recording capacity to retain it is not left in the recording part 71, a data broadcasting application having priority lower than that of the corresponding data broadcasting application is erased from the recording part 71 to thereby ensure the recording capacity. If a data broadcasting application having priority lower than that of the corresponding data broadcasting application is not retained in the recording part 71, the corresponding data broadcasting application is not acquired. However, if possible, it may be acquired and temporarily retained in the cache memory 73.

Expire_date indicates the retention time limit of the corresponding data broadcasting application retained in the recording part 71. If the retention time limit passes, the corresponding data broadcasting application is erased from the recording part 71.

FIG. 33 shows items included in trigger information as the Execute command in the second embodiment. The Execute command is a command for instructing the receiving device 60 to activate a data broadcasting application.

Items included in the trigger information as the Execute command are the same as those included in the trigger information as the Register command shown in FIG. 32. However, in Command_code, information indicating that the command is the Execute command is described.

FIG. 34 shows items included in trigger information as the Inject_event command in the second embodiment. The Execute command is a command for instructing the receiving device 60 to activate a data broadcasting application.

Items included in the trigger information as the Inject_event command in the second embodiment are the same as those in the first embodiment, shown in FIG. 22. However, the number of bits allocated to App_id is different, and App_type is eliminated.

FIG. 35 shows items included in trigger information as the Suspend command in the second embodiment. The Suspend command is a command for making the receiving device 60 suspend the running data broadcasting application.

Items included in the trigger information as the Suspend command in the second embodiment are the same as those in the first embodiment, shown in FIG. 23. However, as differences, the number of bits allocated to App_id is different and App_type is omitted.

FIG. 36 shows items included in trigger information as the Terminate command in the second embodiment. The Terminate command is a command for making the receiving device 60 stop the running data broadcasting application.

Items included in the trigger information as the Terminate command in the second embodiment are the same as those in the first embodiment, shown in FIG. 24. However, as differences, the number of bits allocated to App_id is different and App_type is omitted.

FIG. 37 shows one example of the syntax of trigger information compatible with the trigger information as the second embodiment of the above-described respective commands. However, the syntax of trigger information may be any syntax and is not limited to the example of FIG. 37.

[Explanation of Application Registration Management Processing]

The trigger response processing in the receiving device 60 in the second embodiment is substantially the same as that in the above-described first embodiment. A difference is as follows. In the trigger response processing in the first embodiment, a data broadcasting application is acquired and stored (step S5 in FIG. 28) in response to reception of trigger information as the Pre_cache command. In the second embodiment, application registration management processing is executed in response to reception of trigger information as the Register command. That is, the application registration management processing is executed instead of the step S5 in FIG. 28.

Figure 38:
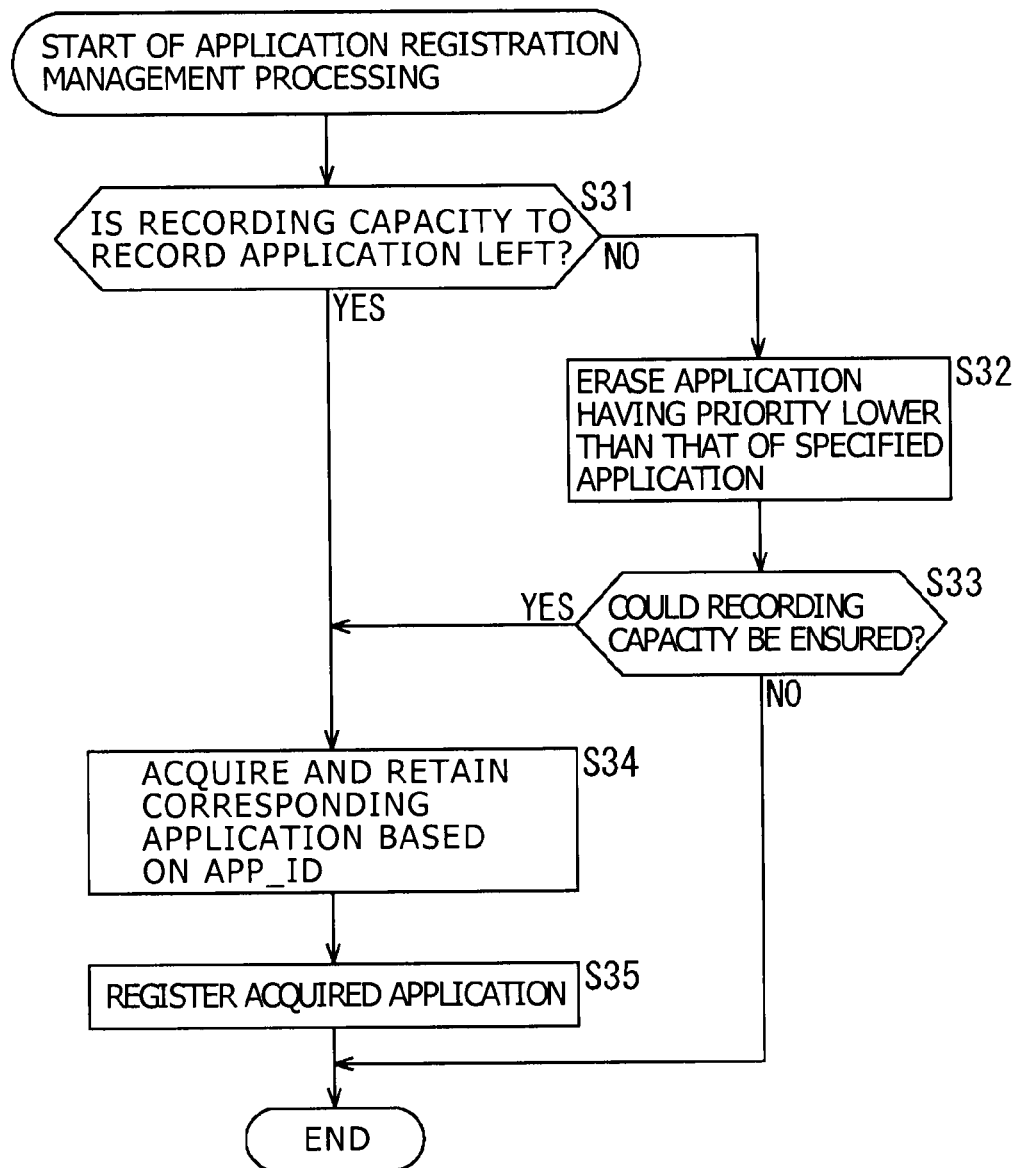
FIG. 38 is a flowchart for explaining application registration management processing.

FIG. 38 is a flowchart for explaining this application registration management processing. The application registration management processing is started if it is determined that received trigger information has the Register command.

In a step S31, the controller 68 determines whether or not the recording capacity to retain the data broadcasting application specified by the trigger information is left in the recording part 71. If it is determined that the recording capacity is left, the processing is forwarded to a step S34. In contrast, if it is determined that the recording capacity is not left, the processing is forwarded to a step S32.

In the step S32, the controller 68 erases, from the recording part 71, a data broadcasting application whose priority is lower than that of the data broadcasting application specified by the trigger information among the data broadcasting applications retained in the recording part 71 (i.e. data broadcasting applications that have been already registered). In a step S33, the controller 68 determines whether or not the recording capacity to retain the data broadcasting application specified by the trigger information could be ensured in the recording part 71. If it is determined that the recording capacity could be ensured, the processing is forwarded to the step S34. In contrast, if it is determined that the recording capacity could not be ensured, the corresponding data broadcasting application is not acquired and the application registration management processing is ended.

In the step S34, the controller 68 makes the data broadcasting application be acquired from its acquisition source indicated by App_id of the trigger information and be retained in the recording part 71. In a step S35, the controller 68 registers the acquired and retained data broadcasting application (manages the data broadcasting application in such a manner as to associate it with its priority and retention time limit). Through the above-described steps, the application registration management processing is ended.

The registered data broadcasting application is erased from the recording part 71 when its retention time limit passes. Thereby, the registration of this data broadcasting application is deleted.

[Second State Transition of Data Broadcasting Application]

Figure 39:
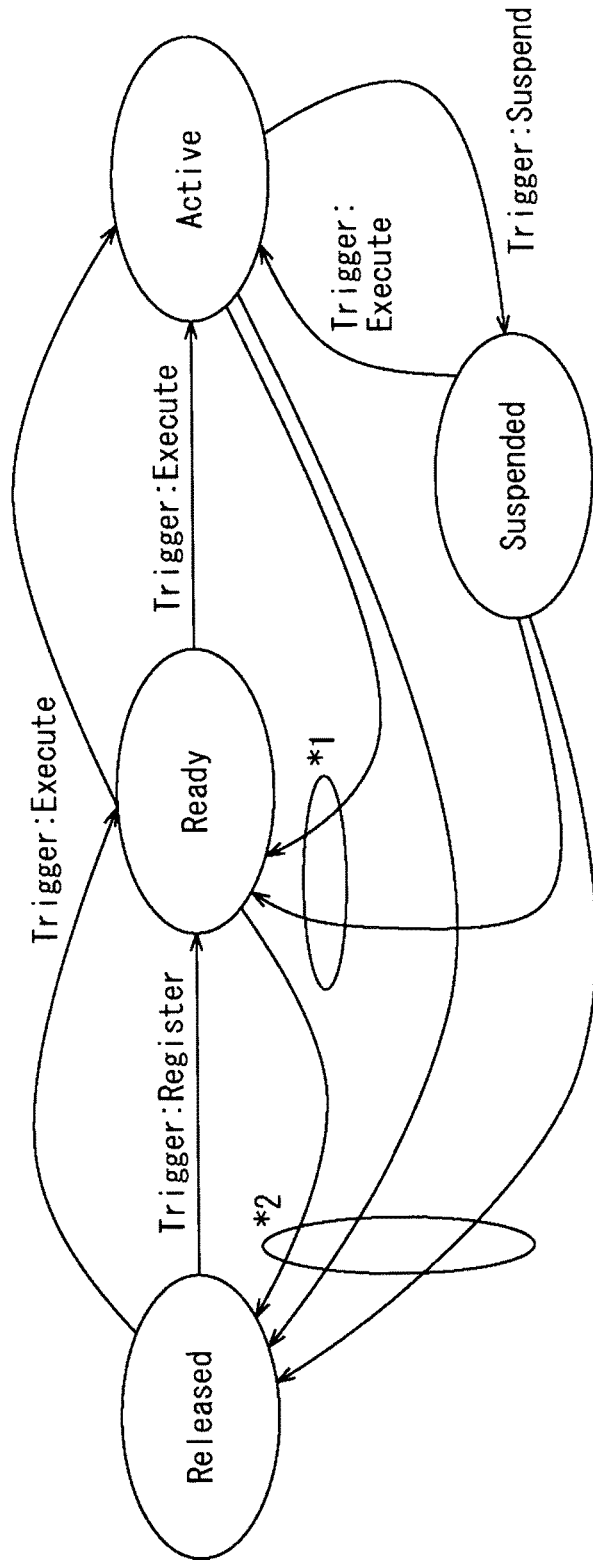
FIG. 39 is a diagram of a second state transition of an application program in the receiving device.

FIG. 39 is a state transition diagram of a data broadcasting application that operates in the receiving device 60 in response to trigger information as the respective commands of Register, Execute, Inject_event, Suspend, and Terminate, which are five kinds of commands in the second embodiment. As shown in FIG. 39, it is defined that the state of the data broadcasting application has transitioned to one of four kinds of states, i.e. Released state, Ready state, Active state, and Suspended state.

The Released state refers to the state in which the data broadcasting application has not yet been acquired into the receiving device 60. The Ready state refers to the state in which the data broadcasting application has been registered in the receiving device 60 and is not activated. The Active state refers to the state in which the data broadcasting application is activated and running. The Suspended state refers to the state in which the execution of the data broadcasting application is interrupted and information indicating the state of the interruption timing is retained in the save memory 75B.

FIG. 40 shows the relationship between the respective commands and the state transition.

When the data broadcasting application has transitioned to the Released state (has not yet been acquired into the receiving device 60), transition to the Ready state occurs if the data broadcasting application is acquired and retained to be registered in response to trigger information of the Register command.

When the data broadcasting application is in the Ready state, transition to the Active state occurs if the data broadcasting application is activated in response to trigger information of the Execute command.

When the data broadcasting application has transitioned to the Released state (has not yet been acquired into the receiving device 60), transition to the Active state occurs if the data broadcasting application is acquired and registered to be activated in response to trigger information of the Execute command.

When the data broadcasting application has transitioned to the Active state, transition to the Suspended state occurs if the running data broadcasting application is interrupted in response to trigger information of the Suspend command.

When the data broadcasting application has transitioned to the Active state, transition to the Ready state occurs if the running data broadcasting application is stopped in response to trigger information of the Terminate command. The transition to the Ready state occurs also when switching of video gets out of App_life_scope or when another data broadcasting application is activated.

When the data broadcasting application has transitioned to the Suspended state, transition to the Active state occurs if the interrupted data broadcasting application is resumed in response to trigger information of the Execute command.

When the data broadcasting application has transitioned to the Suspended state, the data broadcasting application transitions to the Ready state in response to trigger information of the Terminate command.

When the data broadcasting application has transitioned to the Ready state, the Active state, or the Suspended state, if the retention time limit of this data broadcasting application passes, this data broadcasting application is erased from the recording part 71 and the registration thereof is deleted, so that transition to the Released state occurs.

[Life Cycle of Data Broadcasting Application]

In the first embodiment, if a data broadcasting application activated once is stopped, this data broadcasting application is erased from the recording part 71. In contrast, in the second embodiment, a registered data broadcasting application is not erased until its retention time limit passes, even if it is activated and stopped. Therefore, the registered data broadcasting application can be so operated as to be activated and stopped plural times as shown in FIG. 41. However, possibly a data broadcasting application having low priority is erased irrespective of its retention time limit when the capacity of the recording part 71 is insufficient.

FIGS. 41A to 41C show three kinds of life cycle of a data broadcasting application, possible in the second embodiment.

FIG. 41A shows the life cycle of a data broadcasting application that is activated and stopped only one time. This data broadcasting application is registered and activated in response to the Execute command and is stopped and transitions to the Ready state in response to the Terminate command. Thereafter, it is erased from the recording part 71 when its retention time limit passes.

FIG. 41B shows the life cycle of a data broadcasting application that is registered to be activated and stopped plural times. This data broadcasting application is acquired and retained to be registered in response to the Register command. Subsequently, it is activated in response to the Execute command and is stopped and transitions to the Ready state in response to the Terminate command. Thereafter, it is activated in response to the Execute command again and is stopped and transitions to the Ready state in response to the Terminate command. Thereafter, it is erased from the recording part 71 when its retention time limit passes.

FIG. 41C shows the life cycle of a data broadcasting application that transitions to the Suspended state. This data broadcasting application is acquired and retained to be registered in response to the Register command. Subsequently, it is activated in response to the Execute command and transitions to the Suspended state in response to the Suspend command. Thereafter, it is resumed in response to the Execute command and is stopped and transitions to the Ready state in response to the Terminate command. Thereafter, it is erased from the recording part 71 when its retention time limit passes.

[Operation of Plural Data Broadcasting Applications]

Figure 42:
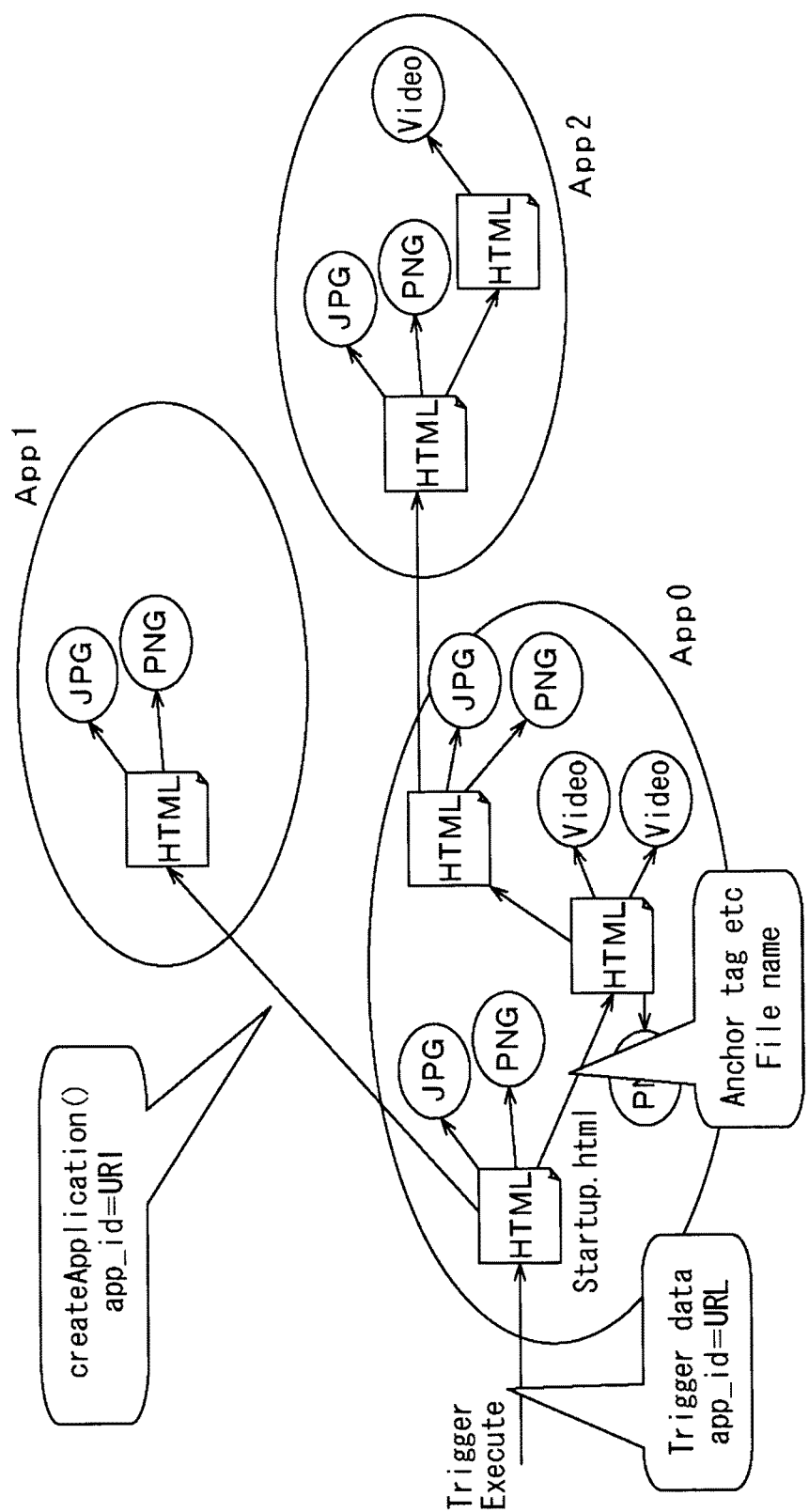
FIG. 42 is a diagram showing the relationship among multi-application programs.

In the above, only the case in which a data broadcasting application is activated in response to trigger information as the Execute command is described. However, it is possible to activate a data broadcasting application without using trigger information as the Execute command. Specifically, as shown in FIG. 42, inside a data broadcasting application App0 activated in response to the Execute command, functions for activating other data broadcasting applications App1, App2, and so forth are described. This can activate the data broadcasting application App1 and so forth depending on e.g. the progression status of the data broadcasting application App0 and user's operation for the data broadcasting application App0.

Figure 43:
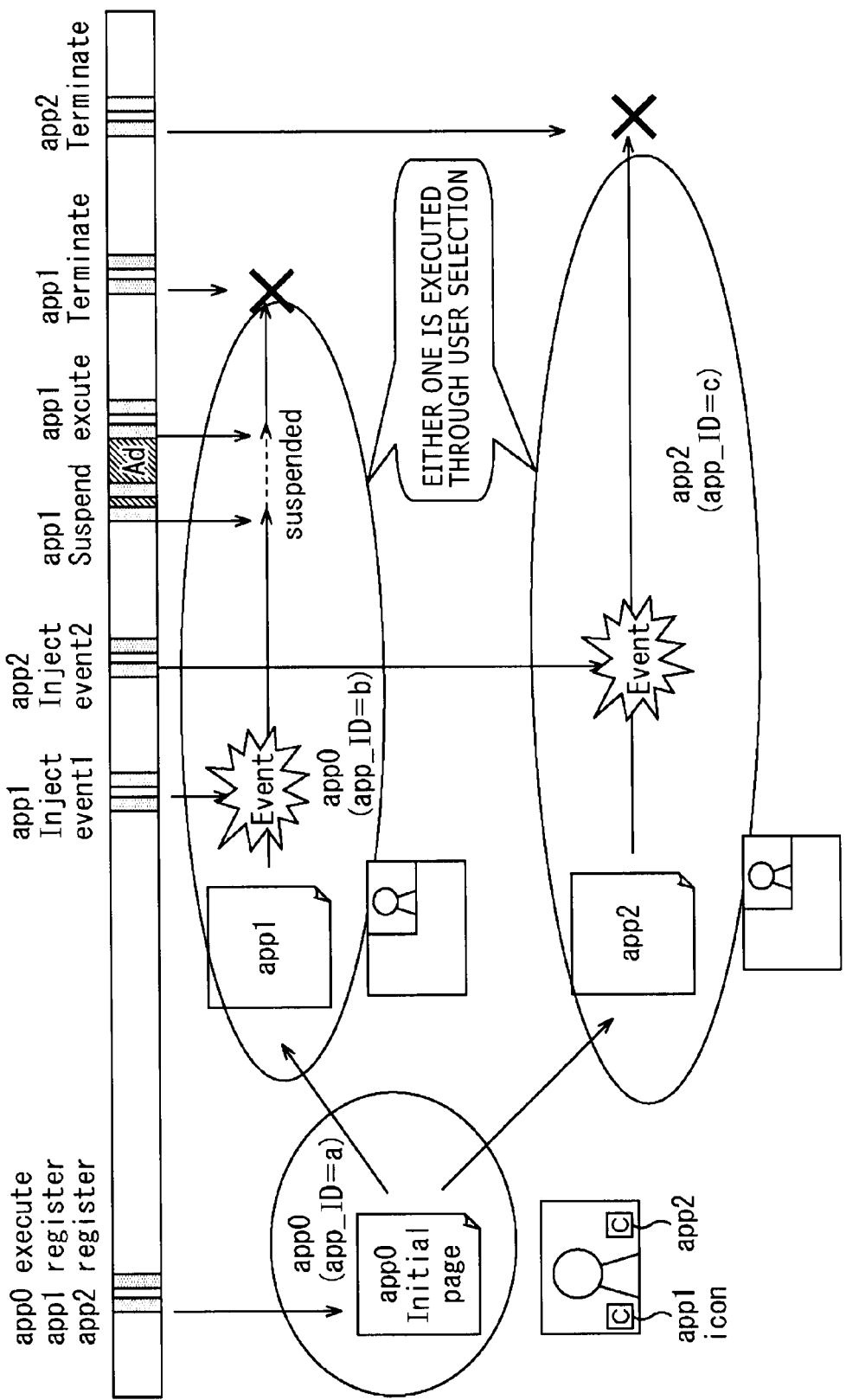
FIG. 43 is a diagram showing an operation example of multi-application programs.

FIG. 43 shows an example of operation in which three data broadcasting applications app0, app1, and app2 are activated in linkage with each other.

First, the following pieces of trigger information are broadcast: trigger information as the Execute command for the data broadcasting application app0, trigger information as the Register command for the data broadcasting application app1, and trigger information as the Register command for the data broadcasting application app2. In the receiving device 60 that has received them, the data broadcasting application app0 is acquired and registered to be activated. On the screen of the executed data broadcasting application app0, icons corresponding to the data broadcasting applications app and app2, respectively, are displayed. Simultaneously, the data broadcasting applications app1 and app2 are acquired and registered.

If the user selects the icon corresponding to the data broadcasting application app1 displayed on the screen of the data broadcasting application app0, the running data broadcasting application app0 is stopped and the data broadcasting application app1 is activated. Thereafter, event firing, suspension, resume, and stop of the data broadcasting application app1 are carried out in response to the Inject_event command, Suspend command, the Execute command, and the Terminate command, respectively, for the running data broadcasting application app1.

If the user selects the icon corresponding to the data broadcasting application app2 displayed on the screen of the data broadcasting application app0, the running data broadcasting application app0 is stopped and the data broadcasting application app2 is activated. Thereafter, event firing and stop of the data broadcasting application app2 are carried out in response to the Inject_event command and the Terminate command, respectively, for the running data broadcasting application app2.

According to the above-described operation, it is possible to activate plural data broadcasting applications in linkage with each other without using trigger information as the Execute command.

As described above, in both the first and second embodiments, processing relating to the data broadcasting application can be executed in conjunction with AV content of show, CM, etc.

Also when a digital television show is retransmitted via e.g. a CATV network or a satellite communication network, service of data broadcasting content that can be in conjunction with the television show can be realized.

The above-described series of processing can be executed by hardware and can be executed also by software. If the series of processing is executed by software, the program configuring the software is installed from a program recording medium into a computer incorporated into dedicated hardware or e.g. a general-purpose personal computer that can execute various kinds of functions through installation of various kinds of programs.

FIG. 44 is a block diagram showing a configuration example of the hardware of a computer that executes the above-described series of processing by a program. In this computer 100, a CPU (central processing unit) 101, a ROM (read only memory) 102, and a RAM (random access memory) 103 are connected to each other by a bus 104.

To the bus 104, an input/output interface 105 is further connected. To the input/output interface 105, the following units are connected: an input unit 106 composed of a keyboard, a mouse, a microphone, etc., an output unit 107 composed of a display, a speaker, etc., a storage unit 108 composed of a hard disk, a non-volatile memory, etc., a communication unit 109 composed of a network interface, etc., and a drive 110 that drives a removable medium 111 such as a magnetic disk, an optical disk, a magnetooptical disk, or a semiconductor memory.

In the computer having the above-described configuration, the CPU 101 loads a program stored in the storage unit 108 into the RAM 103 via the input/output interface 105 and the bus 104 and executes the program for example, and thereby the above-described series of processing is executed.

The program executed by the computer may be a program processed in a time-series manner along the order described in the present specification, or may be a program processed in parallel or at the necessary timing such as when a call is made.

The program may be one processed by one computer, or may be one subjected to distributed processing by plural computers. Furthermore, the program may be one transferred to a distant computer and executed by the computer.

In the present specification, the system refers to the whole device composed of plural devices.

Embodiments in the present disclosure are not limited to the above-described embodiments and various changes can be made without departing from the gist of the present disclosure.

What is claimed is:

1. A transmitting device comprising:
circuitry configured to generate an encoded audio stream in which control information relating to control of an application to be executed in conjunction with content in a receiving device is embedded based on a size of the control information; and
a transmitter configured to transmit the generated encoded audio stream to the receiving device, wherein
the audio stream includes a plurality of audio frames, each of the audio frames including an audio data area and an additional data area, and
when the size of the control information exceeds a size threshold, the control information is divided and embedded in the additional data areas of a plurality of the audio frames in the encoded audio stream.

2. The transmitting device according to claim 1, wherein the additional data area is a user data area, and
the circuitry is configured to supply metadata in which the control information is stored and size information for embedding the metadata in the user data area of the audio frame, and carry out control so that the metadata is embedded in the user data area.

3. The transmitting device according to claim 2, wherein the circuitry is configured to encode the audio stream according to an audio code number 3 (AC3) system to generate the encoded audio stream,
the audio frames are AC3 audio frames,
the additional data area is an area of auxiliary data in a frame data structure of the AC3 audio frame, and
the metadata is inserted in the areas of auxiliary data when the size of the control information exceeds the size threshold.

4. The transmitting device according to claim 2, wherein the circuitry is configured to encode the audio stream according to an advanced audio coding (AAC) system to generate the encoded audio stream,
the audio frames are AAC audio frames,
the additional data area is an area of data stream element in a frame data structure of the AAC audio frame, and
the metadata is inserted in the areas of data stream element when the size of the control information exceeds the size threshold.

5. The transmitting device according to claim 1, wherein the circuitry is further configured to:
encode a video stream to generate an encoded video stream; and
multiplex the encoded audio stream and the encoded video stream to generate a multiplexed stream, and
the transmitter transmits the generated multiplexed stream.

6. The transmitting device according to claim 2, wherein type information indicating a type of information is added to the metadata.

7. The transmitting device according to claim 2, wherein a plurality of kinds of information distinguished by an information identifier are included in the metadata.

8. A transmitting method of a transmitting device that transmits content, the method comprising:
generating, by circuitry of the transmitting device, an encoded audio stream in which control information relating to control of an application to be executed in conjunction with the content in a receiving device is embedded based on a size of the control information; and
transmitting, by the circuitry, the generated encoded audio stream to the receiving device, wherein the audio stream includes a plurality of audio frames, each of the audio frames including an audio data area and an additional data area, and when the size of the control information exceeds a size threshold, the control information is divided and embedded in the additional data areas of a plurality of the audio frames in the encoded audio stream.

9. A non-transitory computer-readable medium storing a program for controlling a transmitting device that transmits content, the program causing a computer of the transmitting device to:

generate an encoded audio stream in which control information relating to control of an application to be executed in conjunction with content in a receiving device is embedded based on a size of the control information; and transmit the generated encoded audio stream to the receiving device, wherein the audio stream includes a plurality of audio frames, each of the audio frames including an audio data area and an additional data area, and when the size of the control information exceeds a size threshold, the control information is divided and embedded in the additional data areas of a plurality of the audio frames in the encoded audio stream.

10. A receiving device comprising:
circuitry configured to
receive an encoded audio stream in which control information, relating to control of an application to be executed in conjunction with content is embedded based on a size of the control information, the encoded audio stream being transmitted from a transmitting device;

decode the received encoded audio stream; and control processing relating to the application-executed in conjunction with the content in response to the control information obtained by decoding the encoded audio stream, wherein the audio stream includes a plurality of audio frames, each of the audio frames including an audio data area and an additional data area, and when the size of the control information exceeds a size threshold, the control information is divided and embedded in the additional data areas of a plurality of the audio frames in the encoded audio stream.

11. The receiving device according to claim 10, wherein the audio frames are audio code number 3 (AC3) audio frames, the additional data area is an area of auxiliary data in a frame structure of the AC3 audio frame, and the circuitry is configured to acquire the control information stored in metadata from the areas of auxiliary data in the frame structure of the AC3 audio frames in the encoded audio stream encoded by an AC3 system when the size of the control information exceeds the size threshold.

12. The receiving device according to claim 10, wherein the audio frames are advanced audio coding (AAC) audio frames, the additional data area is an area of data stream element in a frame structure of the AAC audio frame, and the circuitry is configured to acquire the control information stored in metadata from the areas of data stream element in the frame structure of the AAC audio frames in the encoded audio stream encoded by an AAC system when the size of the control information exceeds the size threshold.

13. The receiving device according to claim 10, wherein the circuitry is further configured to
demultiplex a received multiplexed stream,
decode an encoded video stream demultiplexed from the multiplexed stream, and
decode the encoded audio stream demultiplexed from the multiplexed stream.

14. A television comprising the receiving device according to claim 10.

15. A non-transitory computer-readable medium storing a program for controlling a receiving device that receives content, the program causing a computer of the receiving device to:

receive an encoded audio stream in which control information relating to control of an application to be executed in conjunction with the content is embedded based on a size of the control information, the encoded audio stream being transmitted from a transmitting device;

decode the received encoded audio stream; and control processing relating to the application executed in conjunction with the content in response to the control information obtained by decoding the encoded audio stream, wherein the audio stream includes a plurality of audio frames, each of the audio frames including an audio data area and an additional data area, and when the size of the control information exceeds a size threshold, the control information is divided and embedded in the additional data areas of a plurality of the audio frames in the encoded audio stream.

16. A broadcasting system comprising:
a transmitting device configured to transmit content; and
a receiving device configured to receive the transmitted content,
wherein the transmitting device includes
audio encoder circuitry that generates an encoded audio stream in which control information relating to control of an application to be executed in conjunction with the content in the receiving device is embedded based on a size of the control information, and
a transmitter that transmits the generated encoded audio stream to the receiving device, and
the receiving device includes
a receiver that receives the encoded audio stream transmitted from the transmitting device, and
circuitry that
decodes the received encoded audio stream, and
controls processing relating to the application executed in conjunction with the content in response to the control information obtained by decoding the encoded audio stream, wherein
the audio stream includes a plurality of audio frames, each of the audio frames including an audio data area and an additional data area, and
when the size of the control information exceeds a size threshold, the control information is divided and embedded in the additional data areas of a plurality of the audio frames in the encoded audio stream.

17. A receiving method of a receiving device that receives content, the method comprising:
receiving an encoded audio stream in which control information relating to control of an application to be executed in conjunction with the content is embedded based on a size of the control information, the encoded audio stream being transmitted from a transmitting device;

decoding, by circuitry of the receiving device, the received encoded audio stream; and controlling, by the circuitry, processing relating to the application executed in conjunction with the content in response to the control information obtained by decoding the encoded audio stream, wherein the audio stream includes a plurality of audio frames, each of the audio frames including an audio data area and an additional data area, and when the size of the control information exceeds a size threshold, the control information is divided and embedded in the additional data areas of a plurality of the audio frames in the encoded audio stream.

* * * * *